United States Patent [19]
Usui et al.

[11] Patent Number: 5,793,774
[45] Date of Patent: Aug. 11, 1998

[54] FLASH MEMORY CONTROLLING SYSTEM

[75] Inventors: Fumio Usui; Toshimitsu Kinugasa; Tomoshige Kinoshita; Kyozo Sano, all of Hyogo, Japan

[73] Assignee: Fujitsu Limited, Kawasaki, Japan

[21] Appl. No.: 494,997

[22] Filed: Jun. 27, 1995

[30] Foreign Application Priority Data

Nov. 4, 1994 [JP] Japan ................... 6-271463

[51] Int. Cl.[6] .................................................. G06F 11/00
[52] U.S. Cl. ............................................ 371/21.2; 365/201
[58] Field of Search ................... 371/21.2, 48, 49.1, 371/21.1, 21.6, 3, 30, 40.1; 365/201, 229, 230; 395/182.04, 425, 189.02, 185.05

[56] References Cited

U.S. PATENT DOCUMENTS

| | | | |
|---|---|---|---|
| 5,357,473 | 10/1994 | Mizuno | 365/201 |
| 5,359,569 | 10/1994 | Fujita et al. | 365/229 |
| 5,361,343 | 11/1994 | Kosonocky et al. | 395/425 |
| 5,392,301 | 2/1995 | Fukushima | 371/40.1 |
| 5,488,691 | 1/1996 | Fuoco et al. | 395/185.05 |
| 5,502,732 | 3/1996 | Arroyo et al. | 371/30 |
| 5,515,333 | 5/1996 | Fujita et al. | 365/229 |
| 5,559,956 | 9/1996 | Sukegawa | 395/182.06 |

FOREIGN PATENT DOCUMENTS

| | | |
|---|---|---|
| 62-224854 | 10/1987 | Japan . |
| 62-237551 | 10/1987 | Japan . |
| 2-10596 | 1/1990 | Japan . |
| 4-43447 | 2/1992 | Japan . |
| 4-48331 | 2/1992 | Japan . |
| 4-170797 | 6/1992 | Japan . |
| 5-204561 | 8/1993 | Japan . |

*Primary Examiner*—Robert W. Beausoliel, Jr.
*Assistant Examiner*—Nadeem Iqbal
*Attorney, Agent, or Firm*—Nikaido, Marmelstein, Murray & Oram LLP

[57] ABSTRACT

A flash memory controlling system is disclosed which includes: a flash memory for storing therein data; a check code generating circuit for generating a data error check code; a storage circuit for storing therein the error check code generated by the check code generating circuit; and a control circuit for implementing a process sequence for data read-out or data write-in on the flash memory while storing in the storage circuit the error check code generated by the check code generating circuit for data stored into the flash memory.

18 Claims, 19 Drawing Sheets

Fig.13

WRITE COMMAND SEQUENCE

| ADDRESS | DATA | READ/WRITE |
|---|---|---|
| (1) ADDRESS OF REGISTER | = MUX DATA SELECTION | WRITE |
| (2) 5555H | = AAH | WRITE |
| (3) 2AAAH | = 55H | WRITE |
| (4) 5555H | = A0H | WRITE |
| (5) ADDRESS OF REGISTER | = MUX PARITY SELECTION | WRITE |
| (6) WRITE-IN ADDRESS | = WRITE-IN DATA | WRITE |
| <WRITE-IN OPERATION> | | |
| (7) ADDRESS IN WHICH DATA HAS BEEN WRITTEN | = DATA WRITTEN IN MEMORY | READ (VERIFY) |

Fig.14

WRITE COMMAND SEQUENCE

| ADDRESS | DATA | READ/WRITE |
|---|---|---|
| (1) ADDRESS OF REGISTER | = MUX DATA SELECTION | WRITE |
| (2) 5555H | = AAH | WRITE |
| (3) 2AAAH | = 55H | WRITE |
| (4) 5555H | = A0H | WRITE |
| (5) WRITE-IN ADDRESS | = WRITE-IN DATA | WRITE |
| <WRITE-IN OPERATION> | | |
| (6) ADDRESS IN WHICH DATA HAS BEEN WRITTEN | = DATA WRITTEN IN MEMORY | READ (VERIFY) |

Fig.15A
PRIOR ART

READ/RESET COMMAND SEQUENCE

| | ADDRESS | DATA | READ/WRITE |
|---|---|---|---|
| (1) | 5555H | = AAH | WRITE |
| (2) | 2AAAH | = 55H | WRITE |
| (3) | 5555H | = F0H | WRITE |
| (4) | READ-OUT ADDRESS | = READ-OUT DATA | READ |

<THEREAFTER, DATA CAN BE SUCCESSIVELY READ OUT>

Fig.15B
PRIOR ART

ERASE COMMAND SEQUENCE

| | ADDRESS | DATA | READ/WRITE |
|---|---|---|---|
| (1) | 5555H | = AAH | WRITE |
| (2) | 2AAAH | = 55H | WRITE |
| (3) | 5555H | = 80H | WRITE |
| (4) | 5555H | = AAH | WRITE |
| (5) | 2AAAH | = 55H | WRITE |
| (6) | ERASE ADDRESS | = 30H | WRITE |

<ERASE OPERATION>

| | | | |
|---|---|---|---|
| (7) | ERASE ADDRESS | = FFH | READ (VERIFY) |

Fig.15C
PRIOR ART

WRITE COMMAND SEQUENCE

| | ADDRESS | DATA | READ/WRITE |
|---|---|---|---|
| (1) | 5555H | = AAH | WRITE |
| (2) | 2AAAH | = 55H | WRITE |
| (3) | 5555H | = A0H | WRITE |
| (4) | WRITE-IN ADDRESS | = WRITE-IN DATA | WRITE |

<WRITE-IN OPERATION>

| | | | |
|---|---|---|---|
| (5) | ADDRESS IN WHICH DATA HAS BEEN WRITTEN | = DATA WRITTEN IN MEMORY | READ (VERIFY) |

<COMMAND SEQUENCE IS REQUIRED EVERY WRITE-IN OPERATION.>

FLASH MEMORY CONTROLLING SYSTEM

BACKGROUND OF THE INVENTION

1. Field of the Invention

The present invention relates to flash memory controlling systems and, more particularly, to flash memory controlling systems capable of adding an error check code to data to be stored in a flash memory. The invention further relates to flash memory controlling systems for initializing a flash memory.

2. Description of Related Arts

In recent years, flash memories (a type of electrically rewritable EEPROMs) having a larger storage capacity and a higher memory access speed have been available at a low cost, and widely used in such systems as personal computers and workstations.

These systems require high reliability and, hence, it is essential to provide thereto error detection and/or error correction functions such as parity check and ECC (Error Check & Correction) to ensure data integrity.

The flash memories are EEPROMs incorporating therein a control circuit for memory erasure and data write-in functions and, in most cases, used as an auxiliary storage for storing therein set values and the like. The flash memories require complicated control functions different from those of ordinary memories. Although there is no need to provide a consideration for data loss due to power shut-off, an erase/write control function is required to apply special command sequences to a flash memory via a data port thereof.

FIGS. 15 (A., B., C.) illustrates an exemplary command sequence for accessing a flash memory.

The first command sequence A (FIG. 15A.) is used to perform read-out or reset operation on the flash memory. Data AAH is first written in an address 5555H (in which "H" represents hexadecimal), then data 55H is written in an address 2AAAH, and data F0H is written in the address 5555H. Then, desired data can be read out by accessing an address in which the data is stored. Thus, the data can be read out by implementing the aforesaid four-command sequence. The data can thereafter be read out of the flash memory only by implementing the read command (4).

The second command sequence B (FIG. 15B.) is used for data erasure. Data can be erased by implementing a seven-command sequence as shown in FIG. 15.

The third command sequence C (FIG. 15C.) is used for data write-in. Data can be written into the flash memory by implementing a five-command sequence as shown in FIG. 15. This write command sequence should be implemented every time data is written into the flash memory.

Thus, data is read out of or written into the flash memory by way of such a command sequence which is typically implemented by a bus master such as CPU. When an instantaneous power failure occurs during the implementation of a command sequence or when the flash memory is to be reset, the CPU is required to issue a command sequence to the flash memory for initialization thereof.

Japanese Unexamined Patent Publication No. SHO 62(1987)-237551, for example, discloses a microcomputer system which is similar to the present invention in that the system is adapted to check an error of data stored in a memory. The system including a data memory for data check determines if a memory is RAM or ROM or is not mounted thereon, and then detects a parity error of data.

Japanese Unexamined Patent Publication No. HEI 4(1992)-43447 discloses an ROM diagnosing system having a RAM for storing error check codes and adapted to check an error in the ROM at the end of initialization of the ROM.

However, the systems disclosed in Japanese Unexamined Patent Publications No. SHO 62(1987)-237551 and No. HEI 4(1992)-43447 are designed to check a data error in an ROM or RAM, but not in a flash memory.

Further, Japanese Unexamined Patent Publication No. HEI 5(1993)-204561 discloses a structure of a semiconductor disc which can extend a life of a flash memory having a limited rewritability by employing an alternative memory when part of the flash memory becomes defective.

The following arts are relevant to the present invention in that the systems have a flash memory and a control function for performing data read-out, data write-in or the like operation on the flash memory.

Japanese Unexamined Patent Publication No. SHO 62(1987)-224854 discloses a microcomputer having an EEPROM into which programs and data are written and a write-in control circuit for controlling the data write-in for the EEPROM independently of a CPU, thereby permitting the down-sizing of hardware.

Japanese Unexamined Patent Publication No. HEI 2(1990)-10596 discloses a command port architecture for implementing erasure and programming of a flash EPROM/EEPROM.

Japanese Unexamined Patent Publication No. HEI 4(1992)-48331 discloses a central processing system adapted to electrically rewrite a micro instruction stored in a flash memory and to be implemented by a CPU.

Japanese Unexamined Patent Publication No. HEI 4(1992)-170797 discloses a programming system and an information write-in system which are to be provided between a CPU and a flash EPROM for implementing data erasure and reprogramming of the flash EEPROM without utilizing a dedicated programming device.

However, none of these arts relates to the control of command sequences unique to flash memories.

SUMMARY OF THE INVENTION

It is an object of the present invention to provide a flash memory controlling system capable of checking a data error by adding to data an error check code such as parity bit or ECC bit, thereby improving the reliability of a system utilizing the flash memory.

It is another object of the present invention to provide a flash memory controlling system capable of implementing a command sequence on a flash memory independently of a CPU when the power supply is turned on or when the flash memory is reset.

In accordance with one aspect of the present invention, there is provided a flash memory controlling system including: a flash memory capable of data read-out and data write-in; check code generating means for generating a data error check code; storage means for storing therein the error check code generated by the check code generating means; and control means for implementing a process sequence for data read-out or data write-in on the flash memory while allowing the check code generating means to generate an error check code for data read out of or written into the flash memory, and storing the generated error check code in the storage means.

Since the error check code corresponding to the data to be stored in the flash memory is stored in the storage means, the reliability of the data stored in the flash memory and hence the reliability of a system utilizing the flash memory are significantly improved.

In accordance with another aspect of the present invention, there is provided a flash memory controlling system including: a flash memory; initialization means for generating initialization information; and signal detection controlling means for controlling data read-out and data write-in for the flash memory, the signal detection controlling means being adapted to initialize the flash memory when detecting predetermined initialization information output from the initialization means. The flash memory controlling system may further include check code generating means, storage means and control means as described above.

Since the signal detection controlling means initializes the flash memory upon the detection of the predetermined information, the disablement of the read-out and write-in operations for the flash memory can be prevented even when a reset request occurs due to an instantaneous power failure, abnormal system condition or other requirements.

BRIEF DESCRIPTION OF THE DRAWINGS

FIGS. 13 and 14 are explanatory diagrams of a write command sequence in accordance with the second embodiment of the present invention;

FIG. 15 is an explanatory diagram illustrating command sequences employed for a conventional flash memory;

DESCRIPTION OF THE PREFERRED EMBODIMENTS

Figure 1:
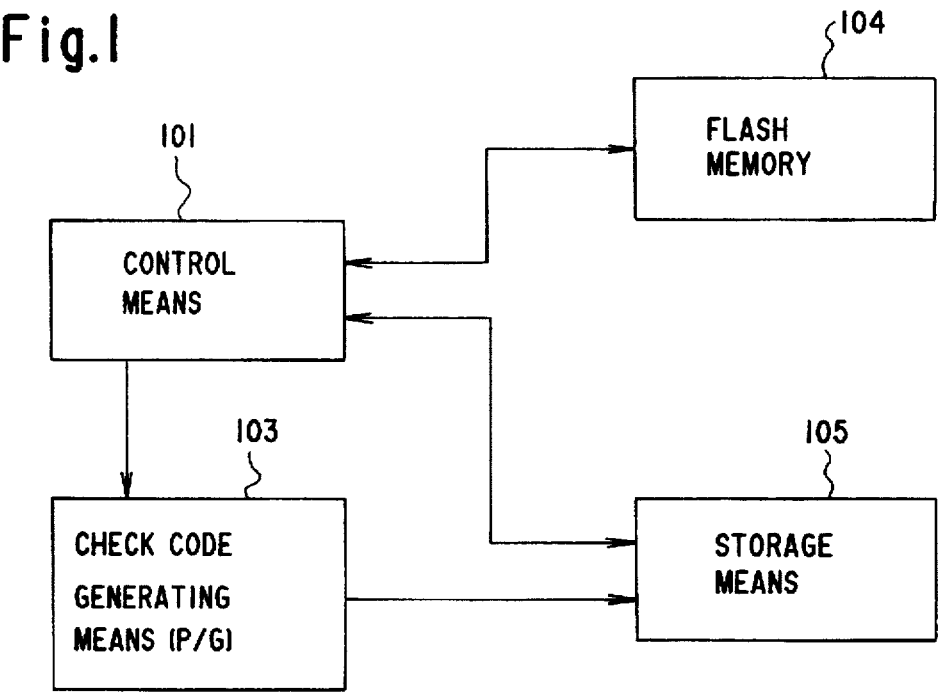
FIG. 1 is a block diagram illustrating a first basic structure of a flash memory controlling system in accordance with the present invention.

FIG. 1 is a block diagram illustrating a first basic structure of a flash memory controlling system in accordance with the present invention. As shown, the flash memory controlling system includes: a first flash memory 104 capable of data read-out and data write-in; check code generating means 103 for generating a data error check code; storage means 105 for storing therein the error check code generated by the check code generating means 103; and control means 101 for implementing a process sequence for data read-out or data write-in on the first flash memory 104 while allowing the check code generating means 103 to generate an error check code for data read out of or written into the first flash memory 104, and storing the generated error check code in the storage means 105.

The storage means 105 may comprise, for example, a volatile memory. In this case, the flash memory controlling system preferably further includes power supply means 106 for backing up the volatile memory for retention of the error check code stored therein.

Figure 2:
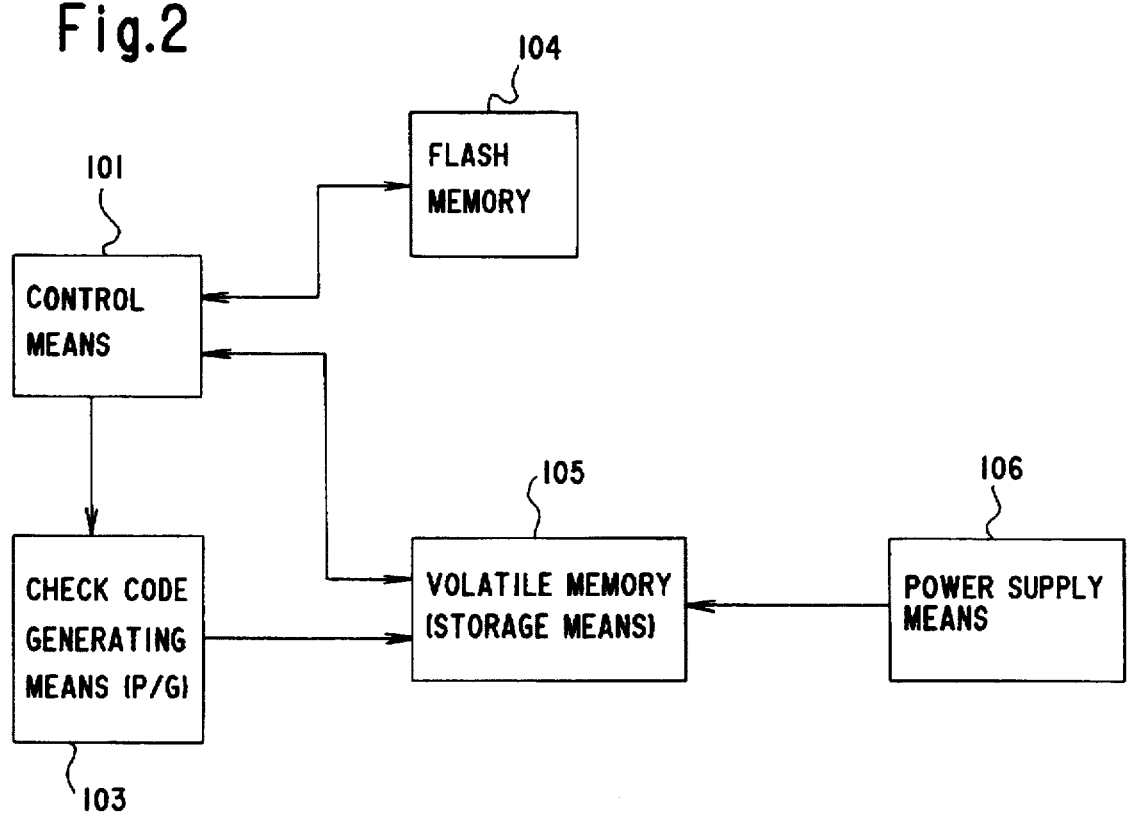
FIG. 2 is a block diagram illustrating a second basic structure of the flash memory controlling system in accordance with the present invention.

In FIG. 2, there is shown a second basic structure of the flash memory controlling system in accordance with the present invention which utilizes such storage means 105 and power supply means 106.

The storage means 105 preferably comprises such a volatile memory as SRAM or DRAM. The SRAM is particularly preferred because the use of the SRAM reduces the production cost of the system.

Though the power supply means 106 may be any power supply device which is capable of electrically backing up the volatile memory when main power supply to the system is shut off, a battery is preferred.

The flash memory 104 is a type of electrically rewritable EFPROM which incorporates therein a control circuit for data erasure and data rewrite, and serves as a non-volatile memory capable of retaining data without the aid of a driving power supply.

The check code generating means 103 may typically be embodied by a one-chip IC or logic circuit, but may be embodied by a software.

The length of data to be input from the check code generating means 103 is 8 bits or 16 bits, and the length of an error check code to be output is typically 1 bit, but not particularly limited thereto.

Exemplary methods of generating an error check code include a parity check and ECC, but not limited thereto. The parity check to be employed may be either an even parity check or an odd parity check.

Typically used as the control means 101 is a microprocessor (CPU) such as one-chip microprocessor which incorporates therein an RAM, an ROM, a timer, an I/O controller and the like. Alternatively, the control means 101 may be any bus master, for example, a DMAC which is capable of exclusively utilizing an address bus and a data bus.

The check code generating means (P/G) 103, flash memory 104 and storage means 105 are, of course, connected to the control means 101 via the address bus and data bus (not shown).

Figure 3:
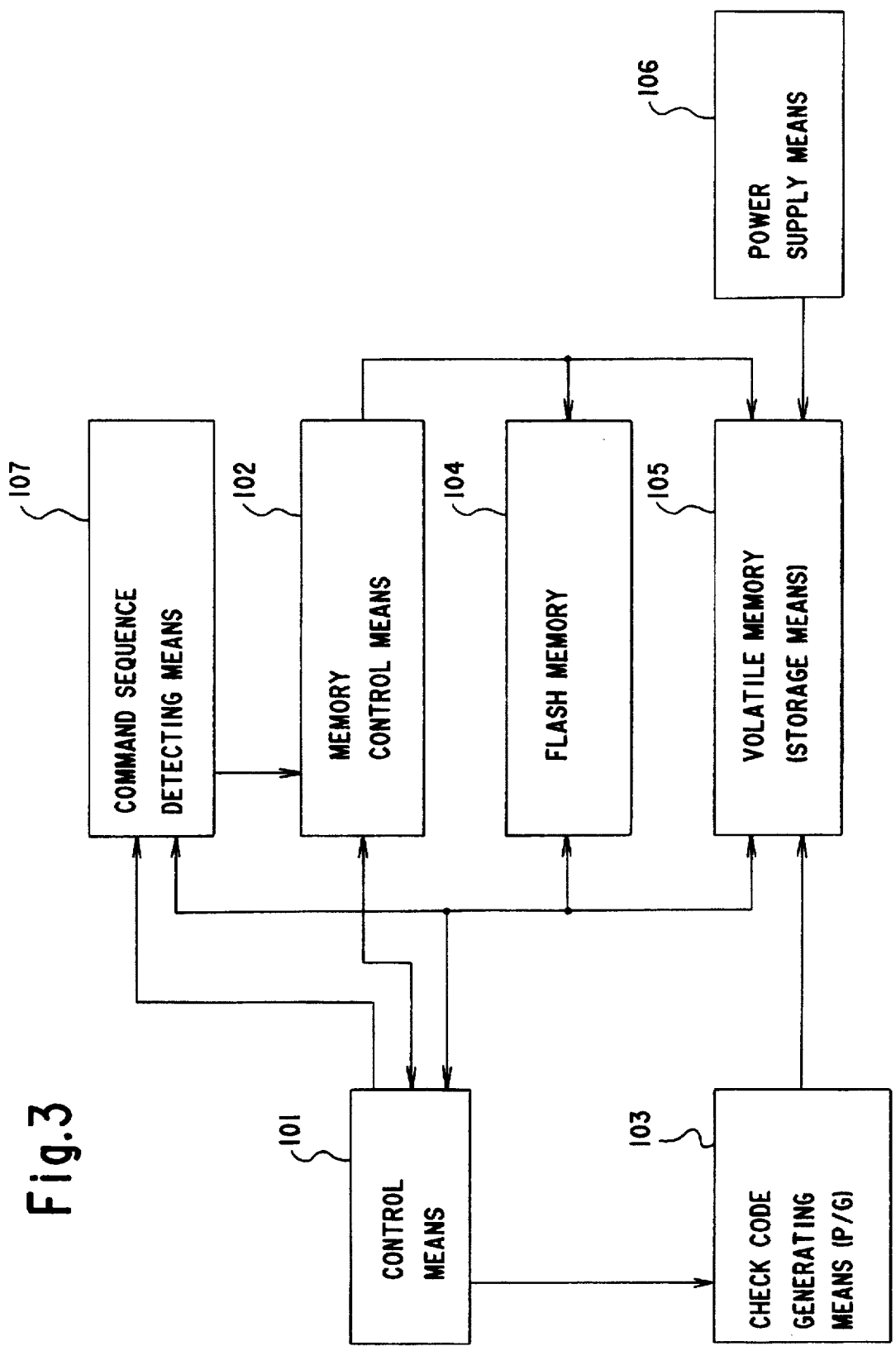
FIG. 3 is a block diagram illustrating a third basic structure of the flash memory controlling system in accordance with the present invention.

As shown in FIG. 3 which illustrates a third basic structure of the flash memory controlling system in accordance with the present invention, the flash memory controlling system further includes: command sequence detecting means 107 for detecting the start and end of a command sequence for data read-out or data write-in during the process sequence implemented by the control means 101; and memory control means 102 for controlling the operations of the first flash memory 104 and storage means 105. When the command sequence detecting means 107 detects the start of the command sequence, the memory control means 102 preferably controls the storage means 105 so as to prevent the control means 101 from performing read-out and write-in operations on the storage means 105 during the implementation of the command sequence. When the command sequence detecting means 107 detects the end of the command sequence, the memory control means 102 preferably controls the first flash memory 104 to permit the control means 101 to perform an actual data read-out or writein operation immediately after the completion of the command sequence, and controls the storage means 105 so as to permit the storage means 105 to implement the read-out or write-in of an error check code.

The memory controlling means 102 preferably employs logic devices in combination and is adapted to control the operations of the first flash memory 104 and storage means 105 to output a so-called chip select signal.

The chip select signal permits or inhibits the access to the first flash memory 104 for the read-out or write-in operation.

The command sequence detecting means 107 detects address decoding, address detection, data detection and the start and end of a command sequence. The command sequence detecting means 107 typically employs logic devices in combination, but not limited thereto.

The command sequence herein means a process sequence required to write data in the flash memory or to read out data from the flash memory.

In general, when the data read-out or write-in operation is performed on an ordinary RAM or ROM, the CPU 101 issues a read command or write command directly to the RAM or ROM. However, the flash memory requires a special process sequence unique thereto prior to the actual data read-out or write-in operation.

For example, the actual data read-out and write-in operations for the flash memory cannot be achieved without implementing a command sequence as shown in FIGS. 13 and 14. More specifically, the command sequence detecting means 107 detects the start and end of the command sequence, and outputs a control signal in accordance with the detection.

Referring to FIG. 3, the control signal output from the command sequence detecting means 107 is input to the memory control means 102 to control the operation of the memory control means 102. The control means 101 is connected to the memory control means 102 and command sequence detecting means 107 via the address bus and data bus not shown in FIG. 3.

Figure 4:
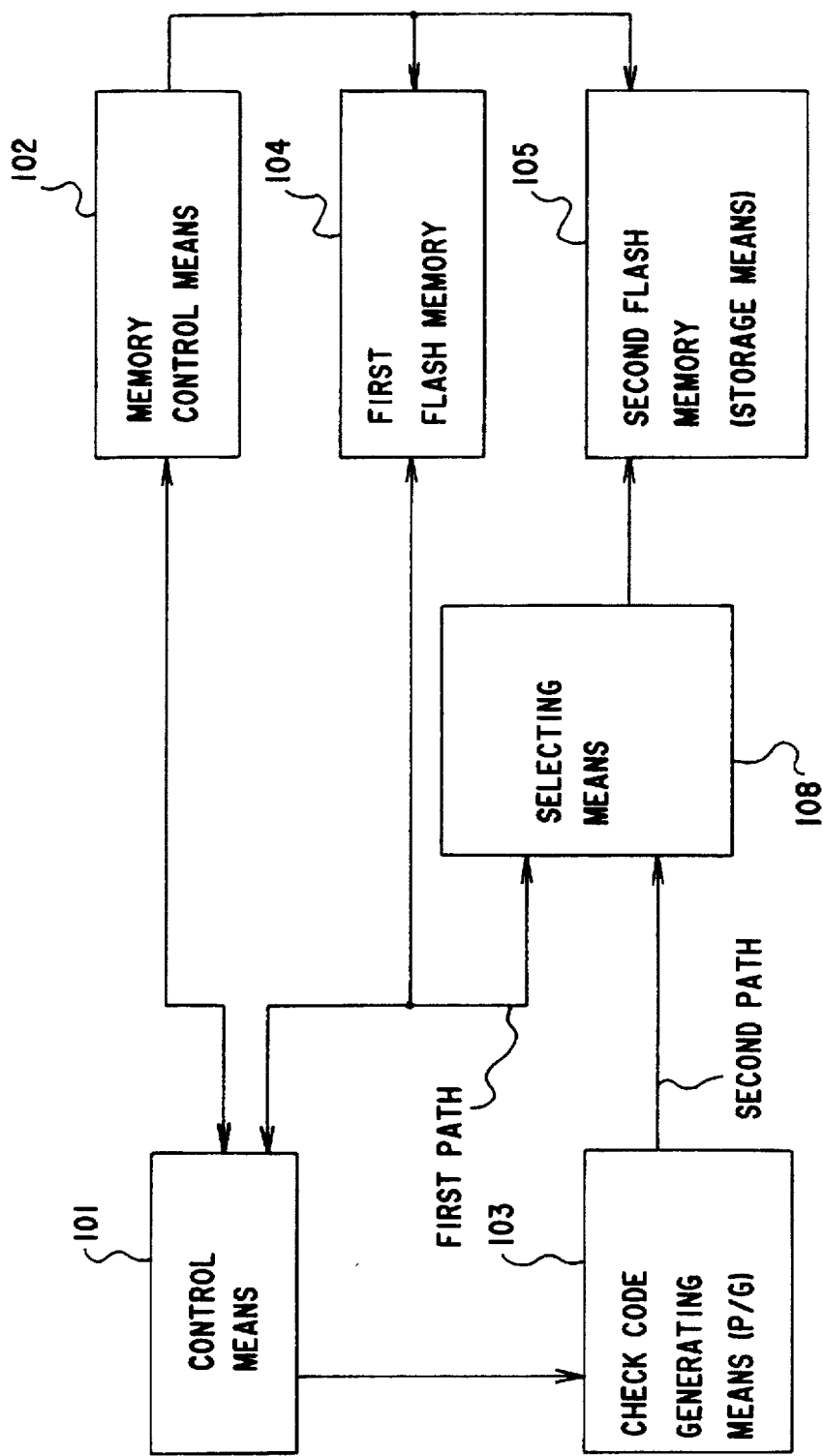
FIG. 4 is a block diagram illustrating a fourth basic structure of the flash memory controlling system in accordance with the present invention.

FIG. 4 is a block diagram illustrating a fourth basic structure of the flash memory controlling system in accordance with the present invention. As shown, the flash memory controlling system of the first structure further includes: a second flash memory 105 serving as the storage means; memory control means 102 for controlling read-out and write-in operations for the second flash memory 105; and selecting means 108 for selecting either one of a first path connecting the control means 101 to the second flash memory 105 and a second path connecting the check code generating means 103 to the second flash memory 105 in accordance with selection information which is written by the control means 101. When the control means 101 implements a command sequence for data read-out or data write-in on the first flash memory 104 during the process sequence, the selecting means 108 selects the first path so that the command sequence is also implemented on the second flash memory 105. When the control means 101 implements actual data read-out or data write-in on the first flash memory 104 during the process sequence, the selecting means 108 selects the second path so that the read-out or write-in of the error check code is implemented on the second flash memory 105, and the memory control means 102 permits the control means 101 to read out of or write into the second flash memory 105 only an error check code corresponding to data to be actually stored in the first flash memory 104.

The selecting means 108 preferably includes a so-called multiplexer (MUX) as a main component and several logic devices employed in combination to realize a selective connection of the two paths.

The first path is a bus line for passing data, which corresponds to a so-called data bus. The path connects the control means 101 to the second flash memory 105 via the selecting means 108. The second path is a bus line for passing an error check code output from the check code generating means 103, and serves to connect the check code generating means 103 to the second flash memory 105 via the selecting means 108.

A line connecting the selecting means 108 to the second flash memory 105 is also a bus line, onto which the data passing through the first path and the error check code passing through the second path are sent from the selecting means 108.

Figure 5:
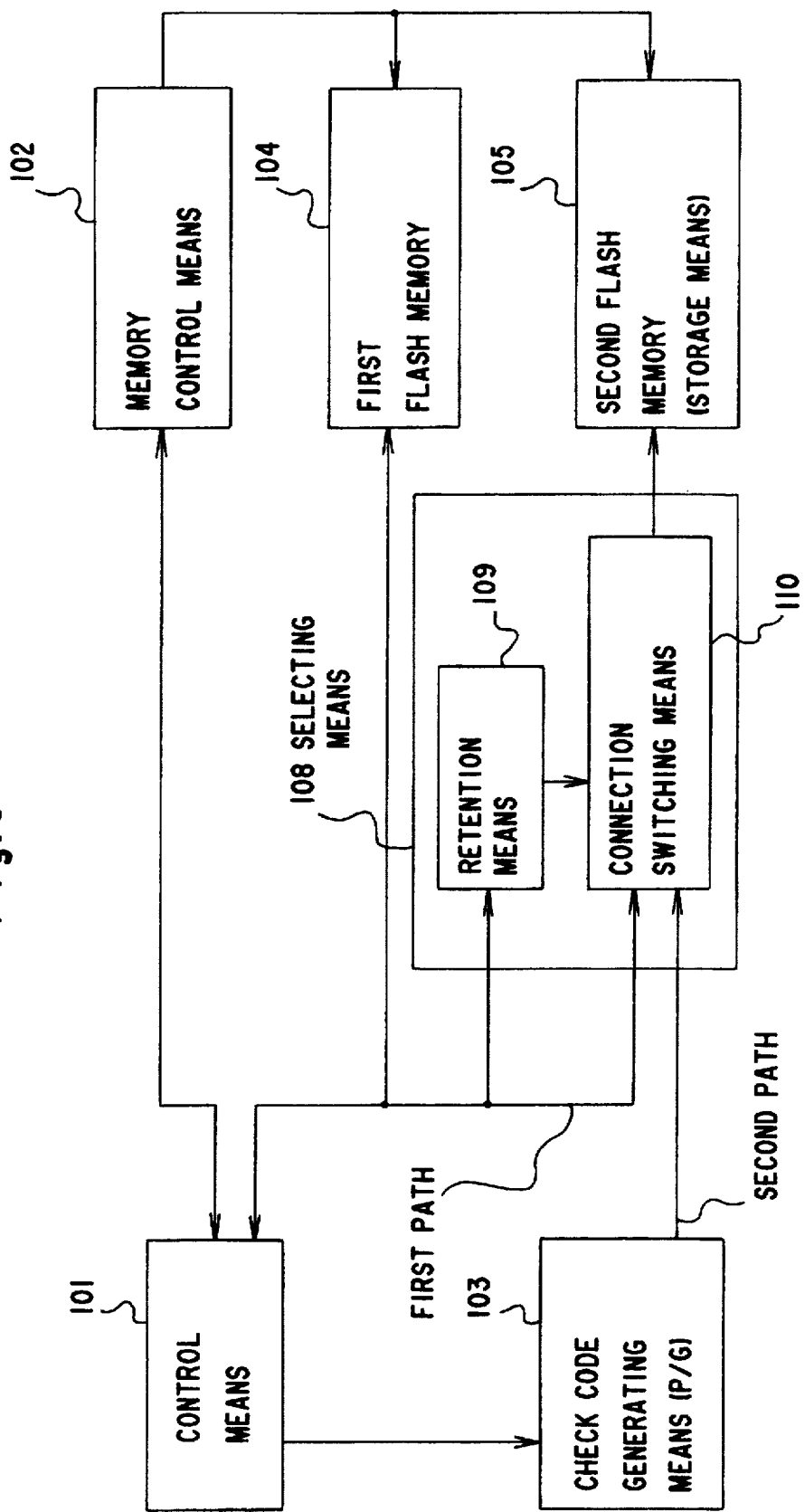
FIG. 5 is a block diagram illustrating a fifth basic structure of the flash memory controlling system in accordance with the present invention.

FIG. 5 is a block diagram illustrating a fifth basic structure of the flash memory controlling system in accordance with the present invention.

As shown, the selecting means 108 shown in FIG. 4 includes retention means 109 for retaining the selection information written therein by the control means 101, and connection switching means 110 for selectively connecting either one of the first and second paths to the second flash memory 105 in accordance with the selection information written therein.

When the control means 101 writes ON information indicative of the start of the command sequence into the retention means 109, the connection switching means 110 connects the first path to the second flash memory 105, and then the control means 101 implements the command sequence. When the control means 101 writes OFF information indicative of the end of the command sequence into the retention means 109, the connection switching means 110 connects the second path to the second flash memory 105, and then the control means 101 implements the read-out or write-in of the error check code on the second flash memory 105.

The retention means 109 is preferably a logic device for retaining set data, e.g., a register, but not limited thereto. The retention means 109 is connected to the connection switching means 110, and the control means 101 writes into the retention means 109 a predetermined value for controlling the connection switching means 110. Preferably used as the connection switching means 110 is a multiplexer (MUX) as mentioned above.

The connection switching means 110 is connected to the control means 101 via the first path, and to the check code generating means 103 via the second path. The connection switching means 110 is further connected to the second flash memory 105 via another path.

The retention means 109 outputs to the connection switching means 110 a signal which is specified by a value written therein. More specifically, the connection switching means 110 is controlled in accordance with the value written into the retention means 109 by the control means 101.

Figure 6:
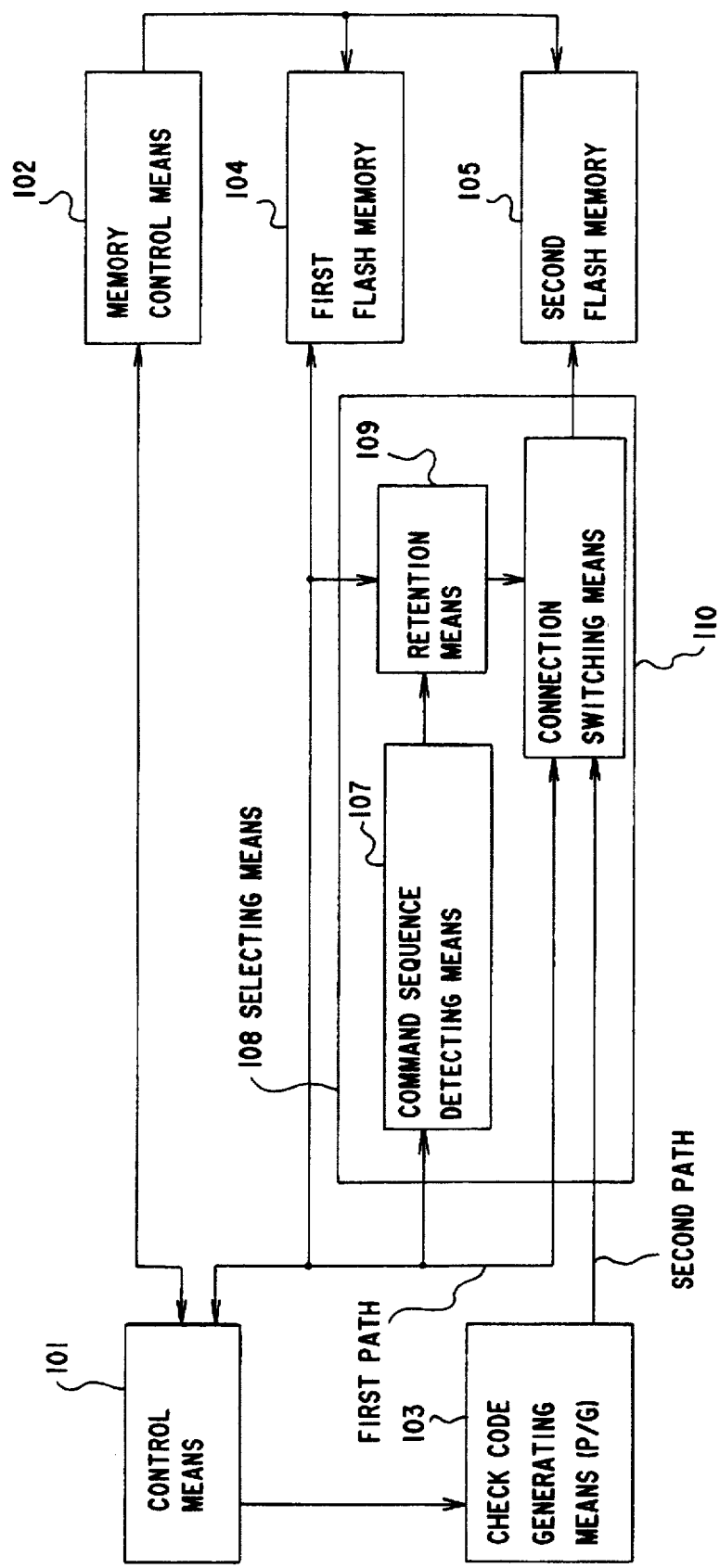
FIG. 6 is a block diagram illustrating a sixth basic structure of the flash memory controlling system in accordance with the present invention.

FIG. 6 is a block diagram illustrating a sixth basic structure of the flash memory controlling system in accordance with the present invention.

As shown, the selecting means 108 further includes command sequence detecting means 107 for detecting the command sequence and providing detection information to the retention means 109. When the command sequence detecting means 107 detects the end of the command sequence and notifies the retention means 109 of the completion of the command sequence, the selection information retained in the retention means 109 is automatically rewritten into OFF information.

The command sequence detecting means 107 employs logic devices in combination and is adapted to be connected to the retention means 109 to output to the retention means 109 a signal indicative of the completion or the command sequence. More specifically, the command sequence detecting means 107 controls the retention means 109 independently of the control means I 01 upon the completion of the command sequence, thereby controlling the connection switching means 110.

Figure 7:
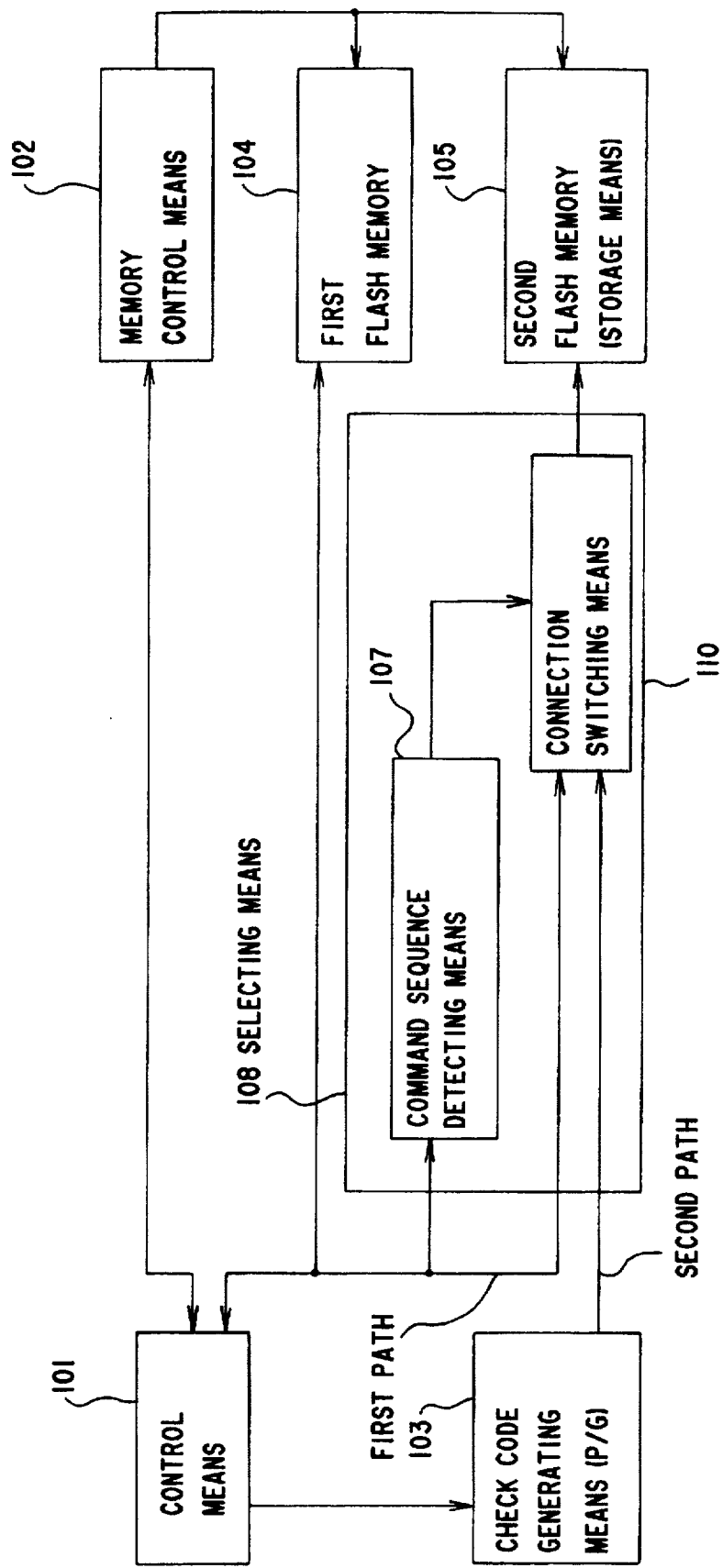
FIG. 7 is a block diagram illustrating a seventh basic structure of the flash memory controlling system in accordance with the present invention.

FIG. 7 is a block diagram illustrating a seventh basic structure of the flash memory controlling system in accordance with the present invention. As shown, the selecting means 108 shown in FIG. 4 includes the command sequence detecting means 107 for detecting the command sequence and outputting detection information, and the connection switching means 110 for selectively connecting either one of the first and second paths to the second flash memory 105 in accordance with the detection information sent from the command sequence detecting means 107. When the command sequence detecting means 107 detects the start of the command sequence, the command sequence detecting means 107 sends the detection information to the connection switching means 110 to allow the connection switching means 110 to connect the first path to the second flash memory 105. When the command sequence detecting means 107 detects the end of the command sequence, the command sequence detecting means 107 sends the detection information to the connection switching means 110 to allow the connection switching means 110 to connect the second path to the second flash memory 105.

The command sequence detecting means 107 is adapted to be connected directly to the connection switching means 110 to output a signal for controlling the connection switching means 110 in accordance with the detected command sequence. More specifically, the command sequence detecting means 107 directly controls the switching operation of the connection switching means 110 independently of the control means 101.

Figure 8:
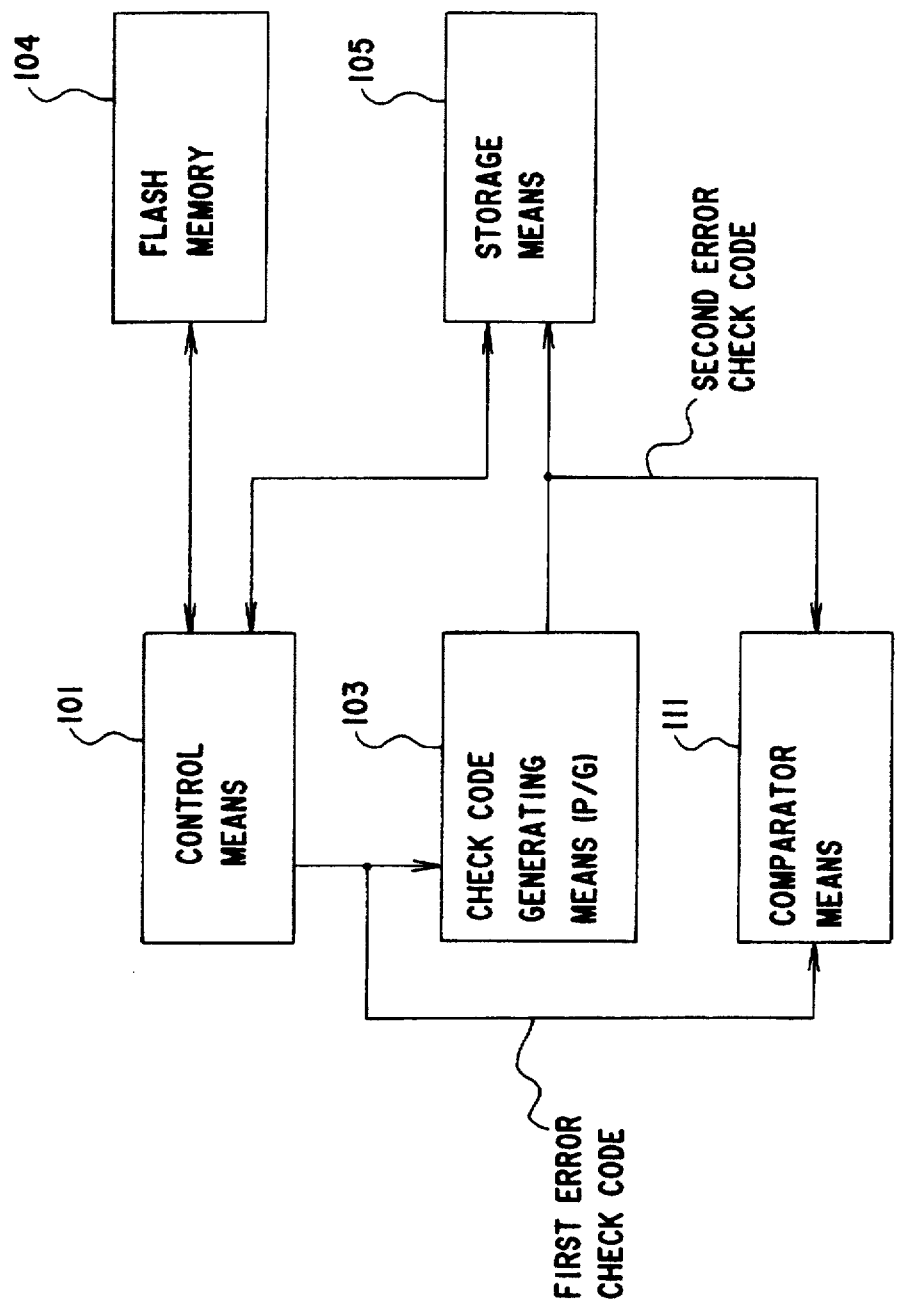
FIG. 8 is a block diagram illustrating an eighth basic structure of the flash memory controlling system in accordance with the present invention.

FIG. 8 is a block diagram illustrating an eighth basic structure of the flash memory controlling system in accordance with the present invention. As shown, the flash memory controlling system of the first basic structure shown in FIG. 1 further includes comparator means 111 for comparing a first error check code stored in the storage means 105 with a second error check code generated by the check code generating means 103.

The comparator means 111 employs logic devices in combination so as to realize a function of judging if the two error check codes input thereto match each other.

The comparator means 111 preferably includes an output (not shown) for outputting a judgment result to the exterior.

If a parity bit is utilized as the error check code, the comparator means 111 detects an error by way of the parity bit. If an ECC bit is utilized as the error check code, the comparator means 111 detects an error by way of the ECC bit and corrects the error.

Figure 16:
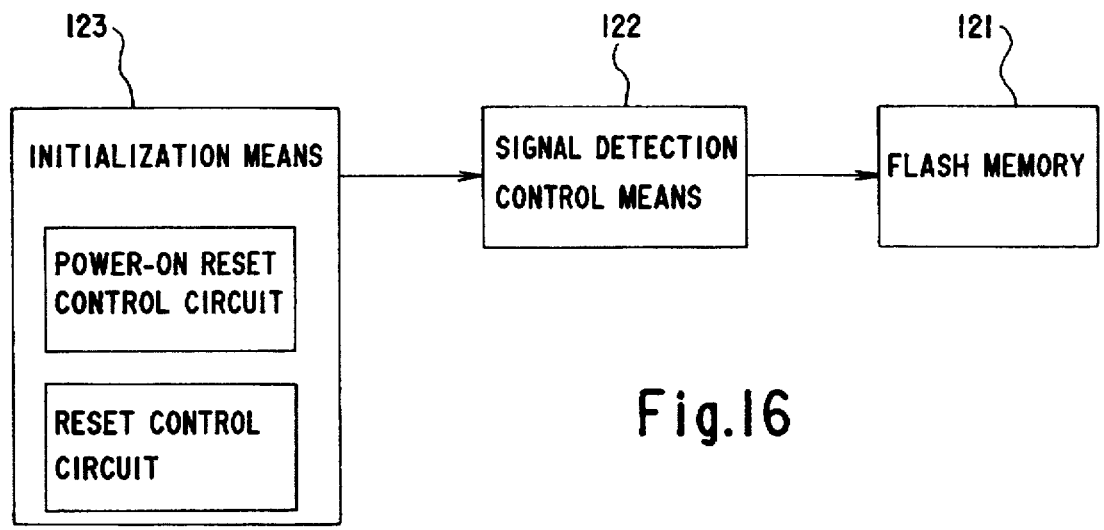
FIG. 16 is a block diagram illustrating a ninth basic structure of a flash memory controlling system in accordance with the present invention.

FIG. 16 is a block diagram illustrating a ninth basic structure of a flash memory controlling system in accordance with the present invention. As shown, the flash memory controlling system includes a flash memory 121, initialization means 123 for generating initialization information, and signal detection controlling means 122 for controlling data read-out and data write-in for the flash memory 121. When detecting predetermined initialization information output from the initialization means 123, the signal detection controlling means 122 initializes the flash memory 121.

Figure 17:
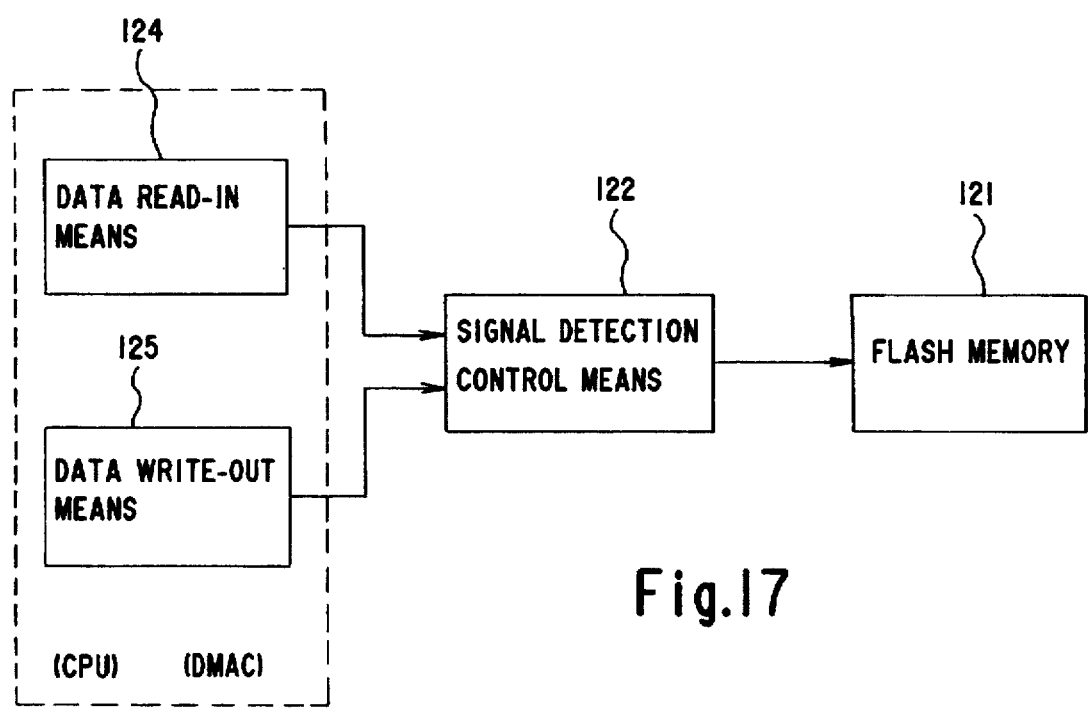
FIG. 17 is a block diagram illustrating a tenth basic structure of a flash memory controlling system in accordance with the present invention.

FIG. 17 is a block diagram illustrating a tenth basic structure of a flash memory controlling system in accordance with the present invention. As shown, the flash memory controlling system includes a flash memory 121, signal detection controlling means 122 for controlling data read-out and data write-in for the flash memory 121, and data write-in means 124. When detecting data write-in information output from the data write-in means 124, the signal detection controlling means 122 performs a data write-in operation on the flash memory 121.

In FIG. 17, the flash memory controlling system may further include data read-out means 125. In this case, the signal detection controlling means 122 performs a data readout operation on the flash memory 121 when detecting data read-out information output from the data read-out means 125.

The flash memory 121 is an electrically rewritable EEPROM, like the aforesaid flash memory 104.

The signal detection controlling means 122 performs an initialization operation, data write-in operation or data read-out operation on the flash memory 121 in accordance with the input information, and preferably employs logic devices in combination so as to perform predetermined operations.

Though the signal detection controlling means 122 can be embodied by a general-purpose logic IC, an ASIC is preferably employed in consideration of system scale, versatility, economy and the like, or alternatively a one-chip LSI may be employed.

The initialization means 123 is a so-called power-on reset control circuit or a reset control circuit which is commonly employed for a system utilizing a computer. The initialization means 123 automatically initializes the entire hardware systems at the time of power on, and initializes the entire hardware or part of the hardware in response to an instruction input from the exterior as required or when an abnormal system condition occurs.

The power-on reset control circuit and the reset control circuit may be any of various commercially available dedicated ICs. Alternatively, the circuit may be fabricated by arranging logic devices on a print board.

The term "initialization" means an operation in which initial values, operation mode and the like are properly set so as to ensure the normal operation of the hardware, and particularly the initialization for the flash memory means that the operation mode of the flash memory is set to a readout mode.

In general, the initialization of the flash memory for setting the operation mode thereof to the read-out mode, which may vary depending on the specifications of the flash memory, is achieved by writing predetermined data into predetermined addresses of the flash memory several times.

The data write-in means 124 and data read-out means 125 employ a CPU, DMAC or the like functional device which is capable of functioning as a so-called bus master in a computer system. The bus master is a functional device that is capable of exclusively utilizing an address bus and a data bus for its own operation.

The CPU or the like device functions as both the data write-in means 124 and the data read-out means 125, and performs functions necessary for a system incorporating therein the CPU by carrying out read-out and write-in operations on an RAM, ROM or EEPROM such as flash memory.

The data write-in and read-out operations to be performed on the flash memory include actual data write-in and read-out operations as well as a write-in process sequence unique to the flash memory performed prior to the actual data write-in and readout operations. In this sense, the data read-out and write-in operations for the flash memory are different from those of ordinary memories such as RAM and ROM.

The present invention will hereinafter be detailed by way of embodiments thereof shown in the attached drawings. It should be noted that the present invention is not limited by these embodiments.

EMBODIMENT 1

Figure 9:
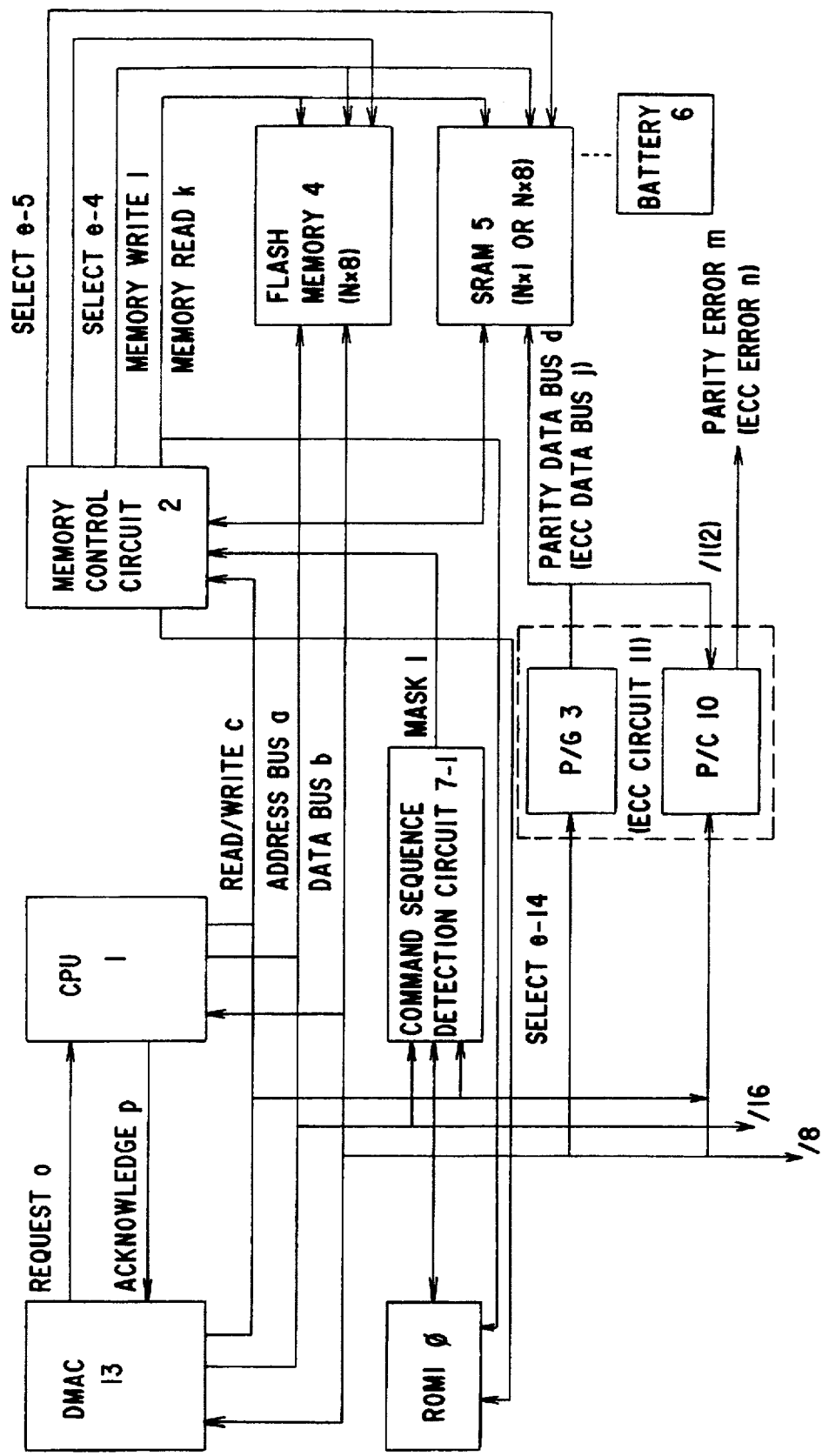
FIG. 9 is a circuit diagram of a flash memory controlling system in accordance with a first embodiment of the present invention.

FIG. 9 is a circuit diagram of a flash memory control circuit in accordance with a first embodiment of the present invention. In this embodiment, a parity is added to data by using an SRAM of N×1 (bits) baked up by a battery.

The flash memory control circuit includes a processor (CPU) 1 for implementing commands in accordance with a program preliminarily incorporated therein, a memory control circuit 2 for controlling memories for data read-out and data write-in, and a parity generator (P/G) 3 for generating a parity for data.

The flash memory controlling means further includes a flash memory 4, a static random access memory (SRAM) 5, a battery 6, a command sequence detection circuit 7-1, a parity check circuit (P/C) 10, an 8-bit direct memory access controller (DMAC) 13, and a read only memory (ROM) 14.

The flash memory 4 is a non-volatile memory in which data erasure and data write-in can be carried out in accordance with a predetermined command sequence issued by the CPU 1. The SRAM 5 is a volatile memory which does not require a data retention operation. The battery 6 serves to supply power to the SRAM 5 even after the main power supply of a main system incorporating the flash memory control circuit is turned off.

Exemplary batteries to be used include an alkaline battery, lithium battery and Ni-Cd battery.

The command sequence detection circuit 7-1 detects a command sequence implemented via an address bus a, a data bus b, read/write signal line c. Particularly in this embodiment, the command sequence detection circuit 7-1 is adapted to inhibit a select signal e-5 of the SRAM 5 via the memory control circuit 2.

The P/C 10 checks a parity error by comparing a parity generated by the P/G 3 with a parity value determined from data read out of the flash memory 4.

The P/G 3 and P/C 10 may be replaced with an error checking and correction (ECC) circuit 11 for checking an ECC error by way of ECC data. The combinational use of the P/G 3 and P/C 10 and the use of the ECC circuit 11 are alternative choices.

The DMAC 13 utilizes the buses independently of the CPU 1 to write or read data into or from the memory. The ROM 14 stores therein programs for the operations of the CPU 1.

The address bus a is used for the transmission of an address signal output from the CPU 1, and the data bus b is used for the transmission of a data signal output from the CPU 1. The read/write signal line c is used for the transmission of a read/write signal for distinguishing read and write cycles performed by the CPU 1. A parity data bus d is used for the transmission of parity data generated by the P/G 3 or parity data read out of the SRAM 5.

Select signal lines e are used for the transmission of a chip select signal e-4 for selecting the flash memory 4, a chip select signal e-5 for selecting the SRAM 5, and a chip select signal e-1 4 for selecting the ROM 14. A mask signal f serves to mask an access to the SRAM 5 during the implementation of a command sequence. An ECC data bus j is used for the transmission of an ECC data signal.

The CPU 1 is of an 8-bit type. The address bus a is of 16 bits, and the data bus b is of 8 bits. The parity data bus d is of 1 bit, and the ECC data bus j is of not less than 2 bits. The flash memory 4 is of N×8 bits (N: natural number), and the SRAM 5 is of N×1 bits or N×8 bits (N: natural number). A parity bit of 1 bit is added to every 8 bit data in the flash memory 4.

A memory read signal k is a signal indicative of an access to the flash memory 4, SRAM 5 or ROM 14 for read-out. A memory write signal I is a signal indicative of an access to the flash memory 4 or SRAM 5 for write-in. A parity error signal m is a signal indicative of the detection of a parity error in the P/C 10. An ECC error signal n is a signal indicative of the detection of an ECC error in the ECC circuit 11. A request signal o is a signal indicating that the DMAC 13 requests the CPU 1 to permit exclusive bus utilization. An acknowledge signal p is a signal indicating that the CPU 1 opens the buses to the DMAC 13 in response to the exclusive bus utilization request of the DMAC 13.

Where the P/G 3 and P/C 10 are replaced with the ECC circuit 11 in FIG. 9, the parity data bus d and parity error m are replaced with the ECC data bus j and parity error n, respectively.

Referring to FIG. 9, it is assumed that the CPU 1 or DMAC 13 writes data into the flash memory 4. When 8-bit data is input to the P/G 3 via the data bus b, 1-bit parity data is generated and written into the SRAM 5 via the parity data bus d.

Where the CPU 1 or DMAC 13 reads out data from the flash memory 4, 1-bit parity data is read out of the SRAM 5 onto the parity data bus d, and then a parity error is checked by comparing the parity data read out onto the parity data bus d with a parity value determined from the 8-bit data on the data bus b in the P/C 10.

The parity check may be either even parity check or odd parity check.

Since the flash memory control circuit is adapted to read out of or write into the less expensive SRAM 5 parity data corresponding to data to be read out of or write into the flash memory, the production cost of the flash memory control circuit can be reduced to the minimum, and yet the reliability thereof can be improved.

Where the flash memory control circuit does not include the command sequence detection circuit 7-1 in FIG. 9, parity data is added to the command sequence which is to be implemented on the flash memory 4 prior to the data read-out and data write-in for the flash memory 4. That is, the parity read-out and write-in for the SRAM 5 are performed during the implementation of the command sequence.

On the other hand, where the flash memory control circuit includes the command sequence detection circuit 7-1 as shown in FIG. 9, the read-out and write-out of the parity for the command sequence is prevented in the following manner.

Where the memory control circuit 2 decodes an address sent from the CPU 1 onto the address bus a to access the flash memory 4, the memory control circuit 2 asserts the select signals e-4 and e-5, and memory read signal k or memory write signal I to access the flash memory 4 and SRAM 5.

However, an erasure instruction and a write-in instruction are written in the flash memory 4, and erasure completion and write-in completion are verified by way of a command sequence prior to the data write-in. This is a point different from ordinary memories.

More specifically, the memory access by way of command sequence is different from an ordinary memory access in that predetermined data is written in a predetermined address by way of the command sequence and, then, data is read out of a predetermined address.

The command sequence detection circuit 7-1 monitors the address bus a, data bus b and read/write signal line c and judges if the current bus cycle is implemented for an ordinary memory access or for a memory access by a command sequence. One example of the command sequence detection circuit 7-1 is shown in FIG. 10.

As shown, the command sequence detection circuit 7-1 includes a decode circuit 20 for detecting an access to the flash memory, an address detection circuit 21 for detecting first to third addresses of a command sequence, a data detection circuit 22 for detecting first to third data of the command sequence, a command sequence start detection circuit 23 for detecting the start of a command sequence, an MUX control circuit 24 for controlling the memory control circuit 2 by outputting a mask signal f to mask an access to the SRAM 5 (or for controlling an MUX 8 to switch between the data bus and the parity data bus by a control signal h), a write command sequence detection circuit 25 for detecting a write command sequence, and a command sequence completion detection circuit 26 for detecting the completion of the command sequence.

A flash memory select signal 1a indicates that the flash memory is selected. A first-address detection signal 1b indicates that a first address of the command sequence is detected. A second-address detection signal 1c indicates that a second address of the command sequence is detected. A third-address detection signal 1d indicates that a third address of the command sequence is detected. A first-data detection signal 1e indicates that first data of the command sequence is detected. A second-ate detection signal 1f indicates that second data of the command sequence is detected. A third-data detection signal 1g indicates that third data of the command sequence is detected. A third-write command detection signal 1h indicates that the third data of the command sequence is a write command. A command sequence start detection signal 1i indicates that the start of the command sequence is detected. A write command sequence detection signal 1j indicates that a write command sequence is detected. A command sequence completion detection signal 1k indicates that the completion of the command sequence is detected.

Figure 10:
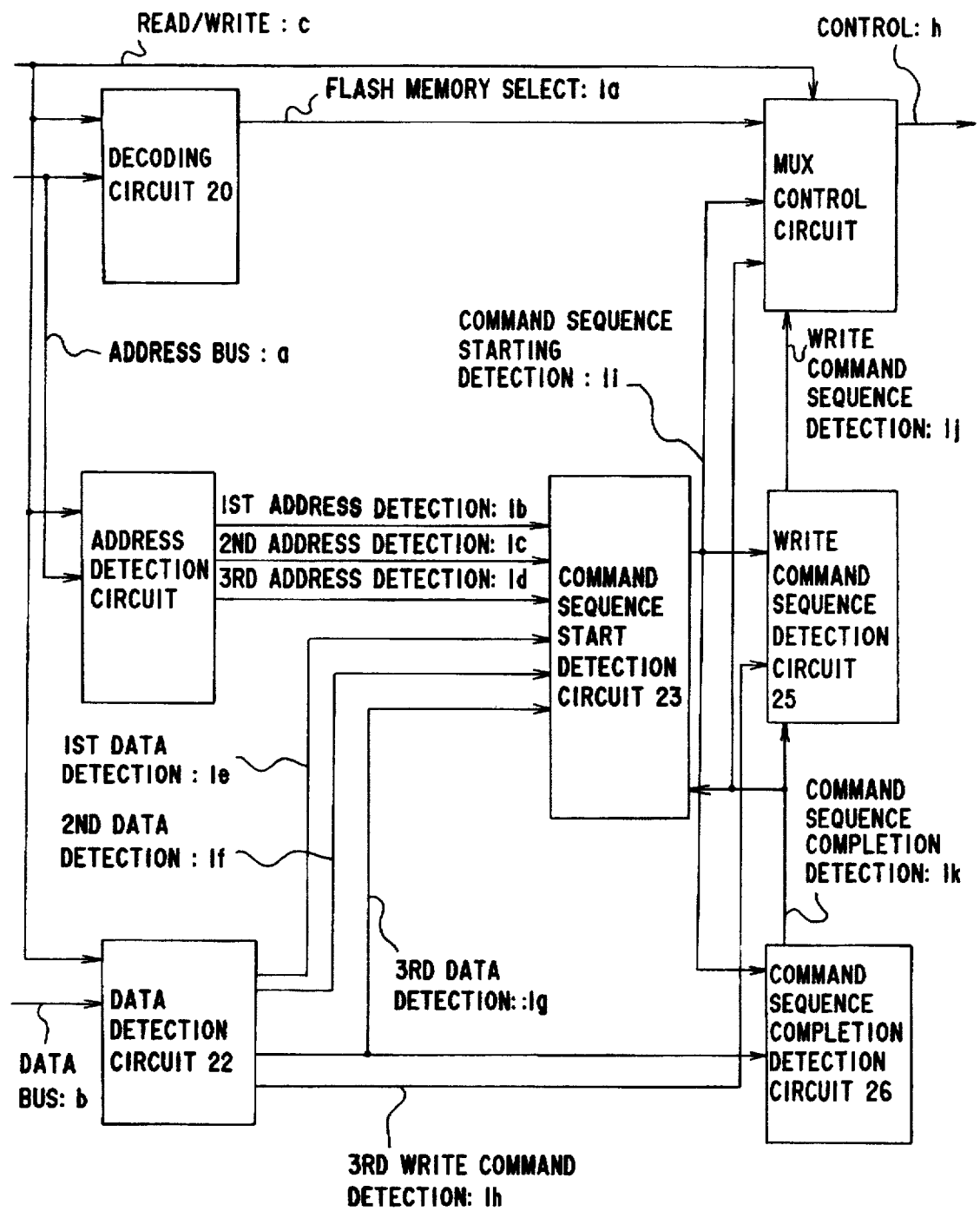
FIG. 10 is a circuit diagram of a commend sequence detection circuit in accordance with the first embodiment of the present invention.

The control signal h output from the MUX control signal 24 shown in FIG. 10 is a signal output from the command detection circuit 7-1, and corresponds to the mask signal f shown in FIG. 9.

Where the current bus cycle is a write command sequence, the command sequence detection circuit 7-1 asserts a mask signal f to the memory control circuit 2 to instruct the memory control circuit 2 not to assert a selection signal e-5 to the SRAM 5. This inhibits the write-in for the SRAM 5, thereby preventing unnecessary parity data from being written into the SRAM 5. Similarly, where the current bus cycle is a read command sequence, the memory control circuit 2 does not assert the select signal e-5 to the SRAM 5, thereby preventing unnecessary parity data from being read out of the SRAM 5.

Where the current bus cycle is implemented for an ordinary memory access, the mask signal f from the command sequence detection circuit 7-1 is not asserted and the select signals e-4 and e-5 from the memory control circuit 2 are asserted as described above. This permits an access to both the flash memory 4 and SRAM 5.

Where the DMAC 13 requires an exclusive bus utilization by outputting a request signal o and the CPU 1 responds thereto by outputting an acknowledge signal p, the DMAC 13 implements the same bus cycle as the aforesaid bus cycle implemented by the CPU 1. That is, the DMAC 13 does not access the SRAM 5 when the read-out or write-in of the command sequence is implemented, but accesses the SRAM 5 only in the case of the ordinary memory access.

Since the flash memory 4 is characterized in the stored data can be retained therein during power off, data written into the flash memory 4 is secured even after the power supply to the entire system is once shut off.

On the other hand, the SRAM 5, through not requiring an operation for data retention, cannot retain data stored therein after the power supply is shut off. Therefore, the SRAM 5 is adapted to be energized by the battery 6 when the power supply to the entire system is shut off. This permits the SRAM 5 to retain the data even after the power supply to the entire system is shut off.

Thus, the data stored in the flash memory 4 and the parity data stored in the SRAM 5 can be secured even after the power supply to the entire system is once shut off and then resumed.

Where the ECC is employed instead of the parity check, the operations of the flash memory 4 and the SRAM 5 are substantially the same as the above, except that the ECC circuit 11 is used instead of the P/G 3 and P/C 10 to perform the ECC check.

EMBODIMENT 2

Figure 11:
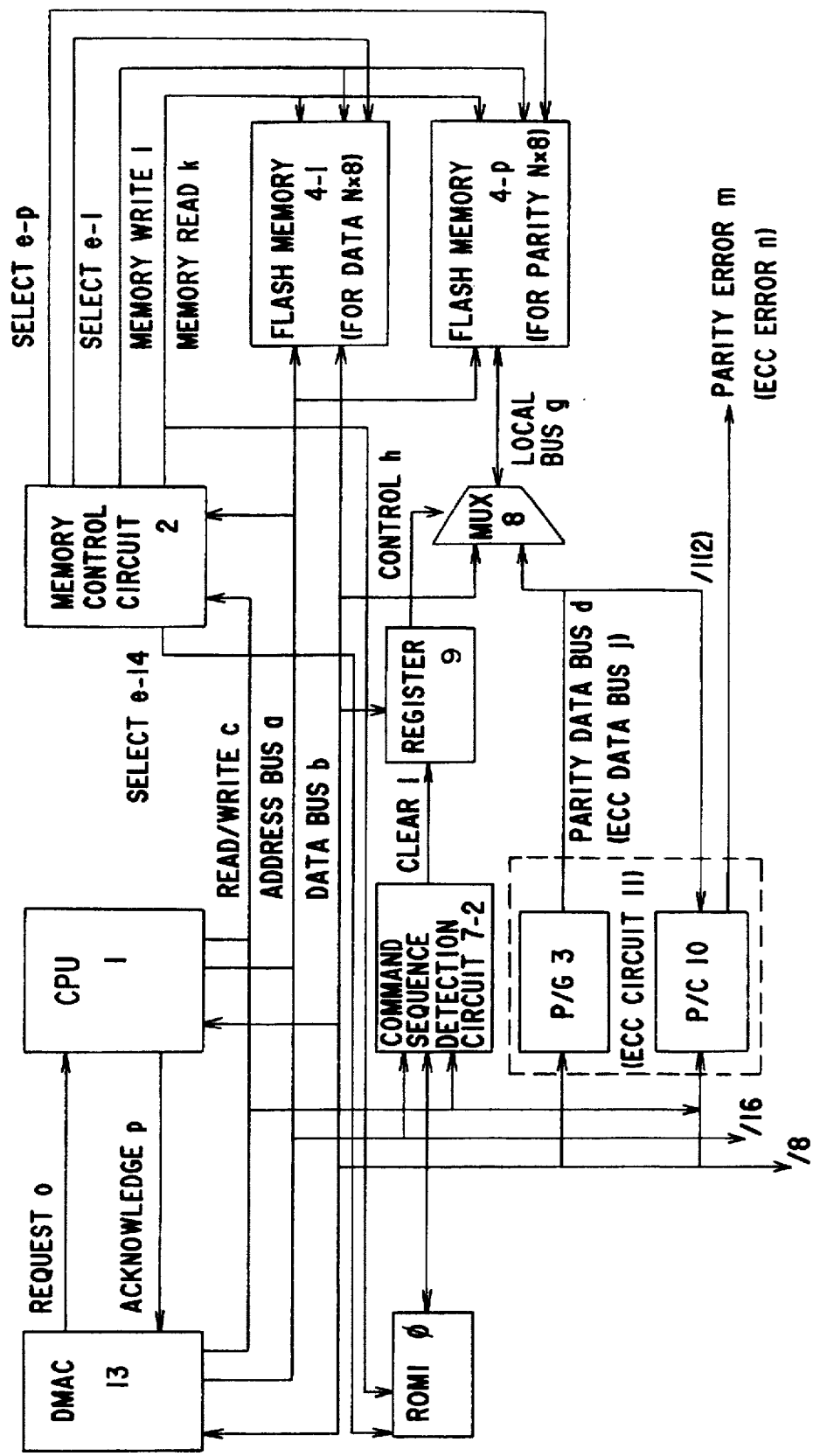
FIG. 11 is a circuit diagram of a flash memory controlling system in accordance with a second embodiment of the present invention.

FIG. 11 is a circuit diagram of a flash memory control circuit in accordance with a second embodiment of the present invention.

This embodiment employs two flash memories, and is adapted to store parity data in one of the flash memories. Therefore, a battery is not necessary for the backup of a memory. Further, this embodiment employs a register and firmware to control the read-out and write-in of parity data.

As shown in FIG. 11, the flash memory control circuit includes a processor (CPU) 1, a memory control circuit 2, a parity generator (P/G) 3 and a parity check circuit (P/C) 10 (or an error checking and correction (ECC) circuit 11), an 8 bit direct memory access controller (DMAC) 13, and a read only memory (ROM) 14. These components have substantially the same functions as those employed in the first embodiment. The flash memory control circuit further includes: a flash memory 4-1 for storing therein N×8-bit data; a flash memory 4-P for storing therein parity data; a multiplexer (MUX) 8 for switching between command data and parity data to output data to the flash memory 4-P for storing therein parities; a register 9 for retaining a control flag to be utilized for data switching by the MUX 8; and a command sequence detection circuit 7-2 for outputting a clear signal i for initialization of the control flag in the register 9. The command sequence detection circuit 7-2 has substantially the same construction as the command sequence detection circuit 7-1 in the first embodiment.

An output to a local bus g is switched by the MUX 8. More specifically, the local bus g is connected to a data bus b during the implementation of a command sequence by the CPU 1, and is connected to a parity data bus d during an ordinary write or read cycle for the flash memory 4-1 implemented by the CPU1 or in an initial state.

The flash memory 4-P is connected to the local bus g, and the MUX 8 is connected to the data bus b and parity bus d.

When data is written in the flash memory 4-1, 1-bit parity data generated by the P/G 3 in accordance with the written data is written in the flash memory 4-P. When data is read out of the flash memory 4-1, 1-bit parity data P1 is read out onto the parity data bus d from the flash memory 4-P. Then, the P/C 10 checks a parity error by comparing a value of the parity data P1 on the parity data bus d with a value of a parity determined from 8-bit data read out onto the data bus b.

The flash memory 4 requires a command sequence, unlike an ordinary memory. Therefore, the MUX 8 switches the connection to the local bus g so that the connection during the implementation of the command sequence is different from that during an ordinary memory access. More specifically, the MUX 8 connects the local bus g to the data bus b during the implementation of the command sequence. Thus, the same command sequence is implemented on both the flash memories 4-P and 4-1.

During the ordinary memory access, the MUX 8 connects the local bus 9 to the parity data bus d to allow the parity data to be read out of or written into the flash memory 4-P. Thus, the flash memory is handled as a memory for storage of parity data.

As can be understood from the foregoing, the parity error check can be realized by employing the flash memory without employing an SRAM which requires a backup by a battery. Therefore, the data reliability can be ensured even if the power supply to the system is stopped for a long time.

Referring to FIG. 11, there will be described an exemplary method of controlling the MUX 8 by means of firmware.

As shown in FIG. 11, the flash memory control circuit includes the register 9 for outputting a control signal h to control the MUX 8 by means of the firmware. The control signal h is controlled by writing a predetermined value into the register 9 by way of the CPU 1 or DMAC 13.

The register 9 has a control flag for the control signal h, into which the CPU1 or DMAC 13 writes a predetermined value. For example, the control signal h is in an ON state when ON information is written into the control flag, and is in an OFF state when OFF information is written into the control flag.

In the initial state, the control signal h is off and, at this time, the MUX 8 connects the local bus g to the parity data bus d.

The CPU1 or DMAC 13 turns on the control signal h of the register 9 just before the implementation of the command sequence to switch the MUX 8, thereby connecting the local bus g to the data bus b.

When the ordinary memory access is implemented after the completion of the command sequence, the control signal h of the register 9 is turned off to switch the MUX 8. Thus, the local bus g is connected to the parity data bus d, thereby allowing the parity data to be written into or read out of the flash memory 4-P.

In this case, the command sequence circuit 7-2 shown in FIG. 11 is optionally employed.

The command sequence detection circuit 7-2 serves to detect the command sequence in the substantially the same manner as the command sequence detection circuit 7-1 shown in FIG. 9. After the completion of the command sequence, a clear signal i output from the command sequence detection circuit 72 is asserted to initialize the control signal h of the register 9.

By this initialization operation, the MUX 8 is automatically switched upon the completion of the command sequence, thereby connecting the local bus g to the parity data bus d.

The ordinary memory access operation is performed in substantially the same manner as in the first embodiment shown in FIG. 9, that is, the memory control circuit 2 decodes an address sent from the CPU1 onto the address bus a. Accesses to the flash memories 4-1 and 4-P are achieved by asserting select signals e-1 and e-P, and memory read signal k or memory write signal 1.

FIGS. 13 and 14 show exemplary write command sequences to be employed in the second embodiment. FIG. 1 3 shows a command sequence to be used where the flash memory control circuit does not have the command sequence detection circuit 7-2, and FIG. 14 shows command sequence to be used where the flash memory control circuit has the command sequence detection circuit 7-2.

Referring to FIGS. 13 and 14, the operations of the flash memory control circuit according to the second embodiment will be described.

When a write command sequence is implemented, the CPU 1 turns on the control flag of the register 9 and, thus, the MUX 8 is switched by the control signal h. This operation which corresponds to commands (1) shown in FIGS. 13 and 14 allows the local bus g to be connected to the data bus b.

When a read command sequence is implemented, the CPU 1 turns on the control flag of the register 9 and, thus, the MUX 8 is switched by the control signal h to connect the local bus g to the data bus b.

A write command sequence (commands (2) to (4) as shown in FIGS. 13 and 14) is thereafter implemented on the flash memories 4-1 and 4-P.

Then, an ordinary memory access (command (5) in FIG. 13) for read-out or write-in is carried out. At this time, the CPU 1 turns off the control flag of the register 9 to switch the MUX 8 by way of the control signal h, thereby connecting the local bus g to the parity data bus d.

Alternatively, where the flash memory control circuit has the command sequence detection circuit 7-2, the command sequence detection circuit 7-2 detects the command sequence and, upon the completion of the detection, asserts a clear signal i.

At this time, the control flag of the register 9 is automatically initialized by the clear signal i, whereby the MUX 8 is switched by way of the control signal h to connect the local bus g to the parity data bus d. Therefore, the CPU 1 can continue the memory access. Thus, the command sequence is simplified as shown in FIG. 14. Specifically, the command (5) to be performed by the CPU 1 shown in FIG. 13 can be omitted, thereby alleviating the burden to the CPU 1.

Thereafter, an ordinary memory access (a command (6) in FIG. 13 or a command (5) in FIG. 4) is carried out for data write-in, and parity data is stored in the flash memory 4-P in substantially the same manner as in the first embodiment. More specifically, where the local bus g is connected to the parity data bus d by the MUX 8, the flash memory 4-P functions as a memory for storing therein the parity data for the flash memory 4-1.

Where the DMAC 13 requests the exclusive bus utilization by a request signal o and the CPU 1 responds thereto by an acknowledge signal p, the DMAC 13 implements a bus cycle in substantially the same manner as in the aforesaid case where the bus cycle is implemented by the CPU 1.

In accordance with the second embodiment, data and parity are stored in the respective flash memories. Therefore, the data and parity data written into the respective flash memories are secured even after the power supply to the circuit or to the entire system is shut off.

Further, where the ECC is employed instead of the parity check, the operations for the flash memories 4-1 and 4-P are performed in substantially the same manner, except that the ECC check is carried out by employing the ECC circuit 11 instead of the P/G 3 and P/C 10. In this case, an ECC data bus j is of not less than two bits.

Thus, the flash memory control circuit according to the second embodiment ensures the reliability of data against a prolonged power shut-off by storing the parity data in the flash memory which does not require a battery for memory backup, unlike the first embodiment.

The provision of the register 9 allows the firmware to control the switching of the MUX 8, thereby realizing a flexible control of the flash memory. Further, the provision of the command sequence detection circuit 7-2 alleviates the burden to the CPU 1 for the flash memory control.

EMBODIMENT 3

Figure 12:
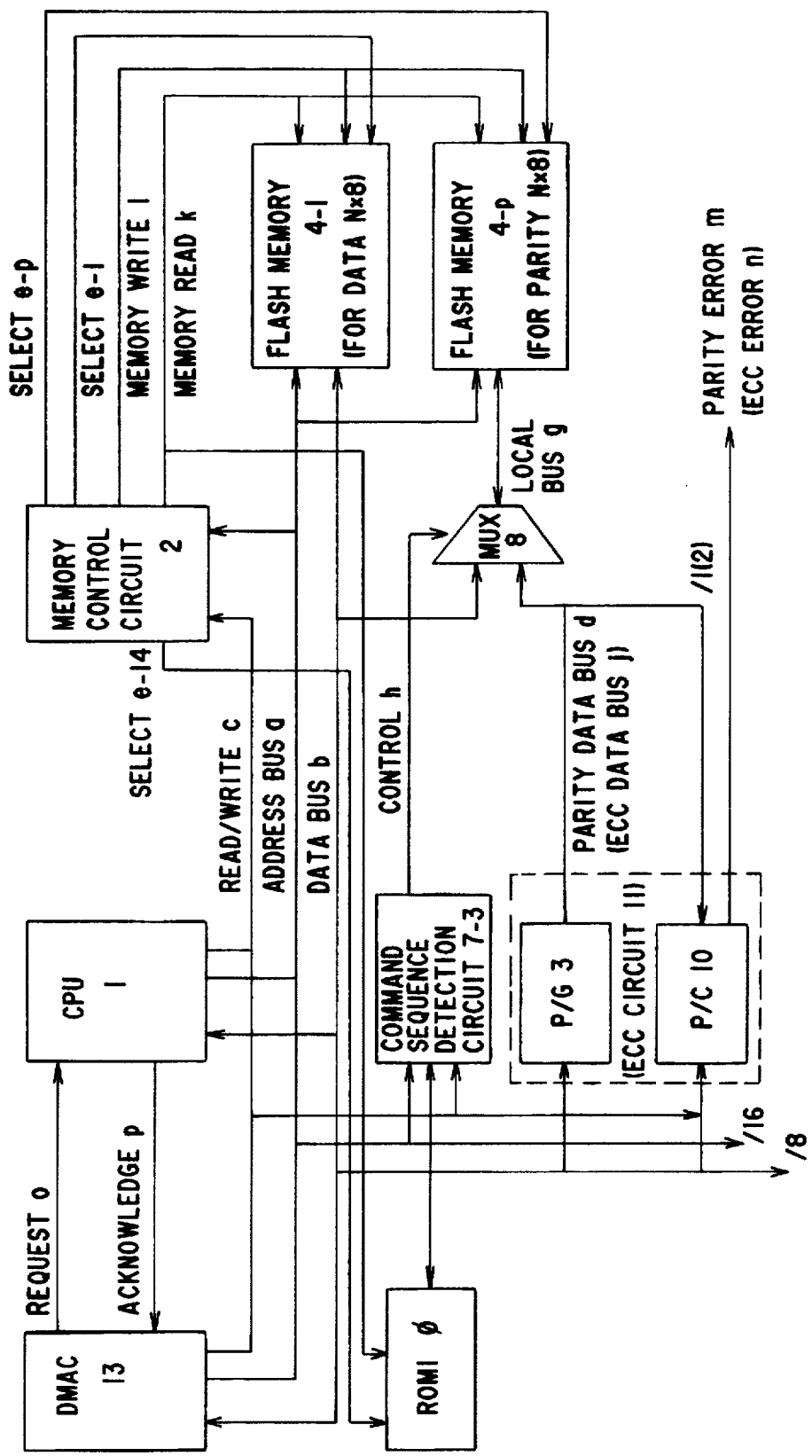
FIG. 12 is a circuit diagram of a flash memory controlling system in accordance with a third embodiment of the present invention.

FIG. 12 shows a flash memory control circuit in accordance with a third embodiment of the present invention.

Similarly to the second embodiment, the third embodiment employs two flash memories, and is adapted to store parity data in one of the flash memories without utilizing a battery for memory backup. The flash memory control circuit has substantially the same circuit structure as that of the second embodiment, except that the command sequence detection circuit 7-2 is replaced with a command sequence detection circuit 7-3 and the register 9 is not provided. In this embodiment, the control of an MUX 8 is achieved by the hardware. That is, the function of the control flag retained in the register 9 shown in FIG. 11 is performed by the command sequence detection circuit 7-3.

The command sequence detection circuit 7-3 monitors the address bus a, data bus b, read/write signal line c to judge if the current bus cycle is an ordinary memory access or a memory access by a command sequence, and controls the MUX 8 by way of a control signal h.

When the MUX 8 is in an initial state, the local bus g is connected to the parity data bus d. During the implementation of the command sequence, the MUX 8 is switched by way of the control signal h to connect the local bus g to the data bus b.

After the completion of the command sequence, the command sequence detection circuit 7-3 switches the MUX 8 by way of the control signal h to connect the local bus g to the parity data bus d, and restores the MUX 8 to the initial state.

The ordinary memory access operation is implemented in substantially the same manner as in the first and second embodiments respectively shown in FIGS. 9 and 11.

Next, an explanation will be given to exemplary write and read command sequences according to the third embodiment.

When a write command sequence is implemented, the command sequence detection circuit 7-3 analyzes data and a signal input thereto from the address bus a, data bus b and read/write signal line c connected to the CPU 1 to detect the write command sequence, and then switches the MUX 8 by way of the control signal h to connect the local bus g to the data bus b. At this time, the write command sequence is implemented on both the flash memories 4-1 and 4-P.

When a read command sequence is implemented, the command sequence detection circuit 7-3 detects the read command sequence by way of the data and signal from the address bus a, data bus b and read/write signal line c connected to the CPU 1, and then switches the MUX 8 by way of the control signal h to connect the local bus g to the data bus b. At this time, the read command sequence is implemented on both the flash memories 4-1 and 4-P.

Upon the detection of the completion of the command sequence, the command sequence detection circuit 7-3 switches the MUX 8 by way of the control signal h, whereby the local bus g is connected to the parity data bus d. Thus, the CPU 1 can continue the ordinary memory access.

As previously described, where the ordinary memory access operation is carried out, the MUX 8 connects the local bus g to the parity data bus d. Therefore, the flash memory 4-P functions as a memory for storing therein parity data for the flash memory 4-1.

Where the DMAC 13 requests the exclusive bus utilization by way of a request signal o and the CPU 1 responds thereto by way of an acknowledge signal o, the DMAC 13 implements the bus cycle in substantially the same manner as in the aforesaid case where the bus cycle is implemented by the CPU 1.

In accordance with the third embodiment, the data and the parity data written into the respective flash memories are secured even after the power supply to the circuit or the entire system is shut off, similarly to the second embodiment.

Further, where the ECC is employed instead of the parity check, the read-out and write-in operations of the flash memories 4-1 and 4-P are performed in substantially the same manner, except that the ECC check is carried out by employing the ECC circuit 11 instead of the PIG 3 and P/C 10. In this case, the ECC data bus j is of not less than two bits.

Thus, the flash memory control circuit of the third embodiment, unlike that of the second embodiment, can control the access to the flash memory independently of the CPU 1, since the MUX 8 is directly controlled in a hardware-dependent manner, i.e., by the command sequence detection circuit 7-3. That is, the reliability of a system utilizing the flash memory can be improved without employing a complicated software control by the CPU 1.

EMBODIMENT 4

There will be described exemplary flash memory controlling systems which are capable of initializing a flash memory or implementing a command sequence independently of a CPU.

Figure 18:
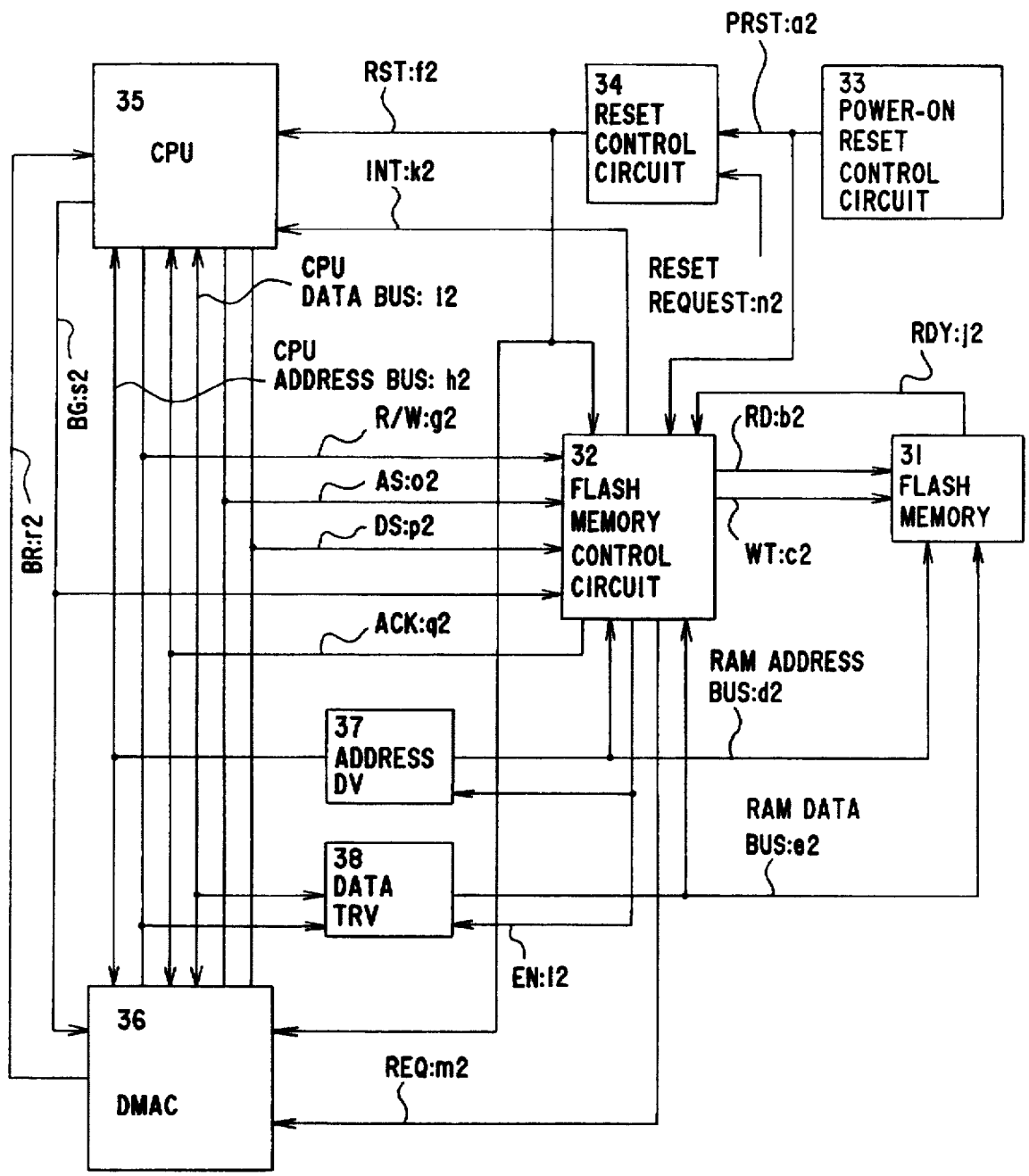
FIG. 18 is a circuit diagram of a flash memory controlling system in accordance with a fourth embodiment of the present invention.

FIG. 18 is a circuit diagram of a flash memory controlling system in accordance with a fourth embodiment of the present invention. As shown, the flash memory control system includes a flash memory 31, a flash memory control circuit 32, a power-on reset control circuit 33, a reset control circuit 34, a microprocessor (CPU) 35, a dynamic access controller (DMAC) 36, an address bus driver (address DV) 37, and a data bus transceiver (data TRV) 38.

The flash memory control circuit 32 reads data out of and writes data into the flash memory 31 and implements a command sequence for the data read-out and data write-in. The poweron reset control circuit 33 initializes the entire hardware or part of the hardware at the time of power on. The reset control circuit 34 initializes the entire hardware or part of the hardware as required or when an abnormal condition occurs during the operation of the system. In general, the power-on reset control circuit 33 and reset control circuit 34 are each embodied as a one-chip logic device. In this case, however, these circuits may preferably be constructed as a single logic device having the functions of the both circuits for hardware cost reduction because many of the circuit components provided thereon can be commonly used.

The CPU 35 executes commands in accordance with programs incorporated in an ROM (not shown) and the flash memory 31. The DMAC 36 directly accesses a memory such as RAM and an I/O controller independently of the CPU.

The address DV 37 separates address buses to the flash memory 31 and to the flash memory control circuit 32. The data TRV 38 separates data buses to the flash memory 31 and to the flash memory control circuit 32.

A power-on reset (PRST) signal a2 is a signal which is output from the power-on reset control circuit 33 at the time of power on for initializing the entire hardware or part of the hardware. A flash memory read (RD) signal b2 is a control signal for reading out data from the flash memory 31. A flash memory write (WT) signal c2 is a control signal for writing data into the flash memory 31.

A memory address bus (RAM address bus) d2 is an address bus for the transmission of an address of the flash memory 31. A memory data bus (RAM data bus) e2 is a data bus for the transmission of data from the flash memory 31. A reset (RST) signal f2 is a signal for initializing the entire hardware or part of the hardware as required or when an abnormal condition of the CPU or the like occurs.

A read/write (R/W) signal g2 is a control signal for providing the flash memory control circuit 32 or the like with information indicating which cycle (read-out cycle or write-in cycle) the CPU 35 and DMAC 36 are currently implementing. A processor address bus (CPU address bus) h2 is an address bus connected to the CPU 35 and DMAC 36. A processor data bus (CPU data bus) i2 is a data bus connected to the CPU 35 and DMAC 36.

A ready (RDY) signal j2 is a signal for providing the flash memory control circuit 32 with information indicative of the completion of erasure or write-in of the flash memory 31. An interrupt (INT) signal k2 is a signal for providing from the flash memory control circuit 32 to the CPU 35 information indicative of the completion of erasure or write-in of the flash memory 31.

A bus enable (EN) signal l2 is a control signal which is output from the flash memory control circuit 32 for controlling the open and close of the address bus driver 37 and the data bus transceiver 38. A request (REQ) signal m2 is a signal which is output from the flash memory control circuit 32 for requesting the DMAC 36 to output the next data.

A reset request signal n2 is a signal which is input from the external or by way of a switch or the like for requesting the reset control circuit 34 to perform a reset operation as required or when an abnormal condition occurs. An address strobe (AS) signal o2 is a signal indicative of the validity of an address output from the CPU 35 or DMAC 36. A data strobe (DS) signal p2 is a signal indicative of the validity of data output from the CPU 35 or DMAC 36.

An acknowledge (ACK) signal q2 is a signal which is output from the flash memory control circuit 32 for requesting the CPU 35 or DMAC 36 to terminate a bus cycle. A bus request (BR) signal r2 is a signal which is output from the DMAC 36 for requesting the CPU 35 to permit exclusive bus utilization. A bus grant (BG) signal s2 is a signal indicating that the CPU 35 opens the buses for the DMAC 36 in response to the BR signal r2.

Figure 19:
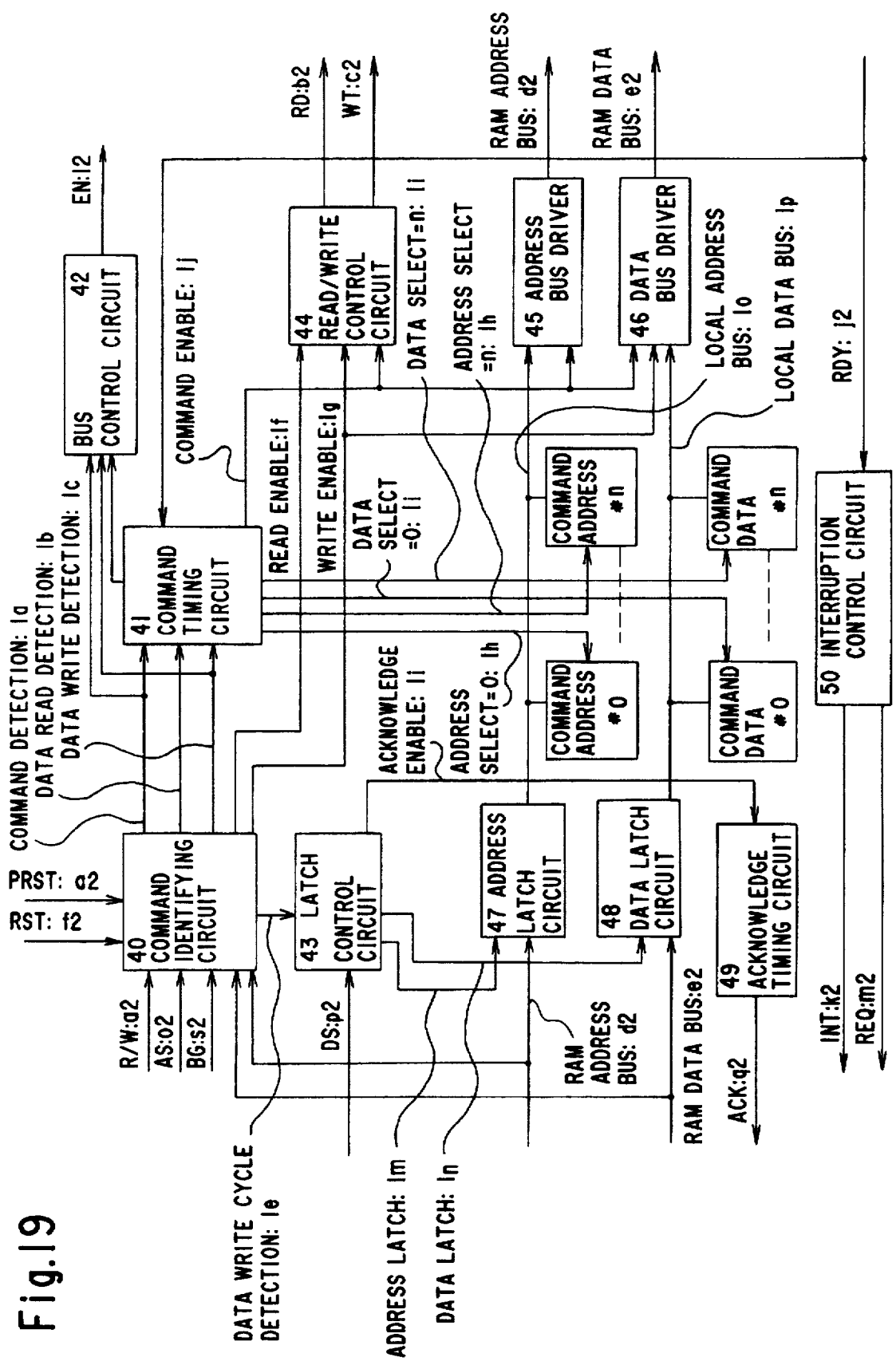
FIG. 19 is a block diagram illustrating a flash memory control circuit shown in FIG. 18.

FIG. 19 is a block diagram illustrating one example of the flash memory control circuit 32 shown in FIG. 18. As shown, the flash memory control circuit 32 includes a command identifying circuit 40, a command timing circuit 41, a bus control circuit 42, a latch control circuit 43, a read/write control circuit 44, an address bus driver circuit 45, a data bus driver circuit 46, an address latch circuit 47, a data latch circuit 48, an acknowledge timing circuit 49, and an interruption control circuit 50.

The command identifying circuit 40 identifies the control signals (RST, PRST) of the CPU 35 and DMAC 36 and a command sent from the address bus and data bus to the flash memory 31. The command timing circuit 41 controls a pulse timing at which the command is issued to the flash memory 31. The bus control circuit 42 controls the address DV 37 and the data TRV 38. The latch control circuit 43 controls the latches of addresses and data during a data write cycle. The read/write control circuit 44 controls the RD signal b2 and WT signal c2 issued to the flash memory 31. The address bus driver circuit 45 outputs an address onto the RAM address bus d2. The data bus driver circuit 46 outputs data to the RAM data bus e2. The address latch circuit 47 latches addresses output from the CPU 35 or DMAC 36 during the data write cycle. The data latch circuit 48 latches data output from the CPU 35 or DMAC 36 during the data write cycle. The acknowledge timing circuit 49 controls the acknowledgment of the bus cycle during the data write cycle. The interruption control circuit 50 controls the INT signal k2 to the CPU 35 and the REQ signal m2 to the DMAC 36.

Command address circuits #0 to #n each store therein an address of a predetermined command. Command data circuits #0 to #n each stores therein data of a predetermined command.

When the flash memory control circuit 32 having such a structure receives a data write-in command output from the CPU, for example, the command identifying circuit 40 analyzes the command, and the read/write control circuit 44 outputs to the flash memory 31 a WT signal c2 in response to the command. Then, a predetermined address and data are output from the corresponding command address circuit #0 to #n and from the corresponding command data circuit #0 to #n.

Next, an explanation will be given to the operation of the flash memory controlling system of this embodiment.

It is herein assumed that the flash memory 31, like an ordinary flash memory, requires three write-in operations for the implementation of one command sequence and, after the completion of the command sequence, the flash memory 31 automatically enters a read-out mode. It is further assumed that an initial program to be executed by the CPU 35 at the time of power on is stored in the flash memory 31.

First of all, there will be described a method of controlling the flash memory when the flash memory controlling system shown in FIG. 18 is turned on.

Figure 20:
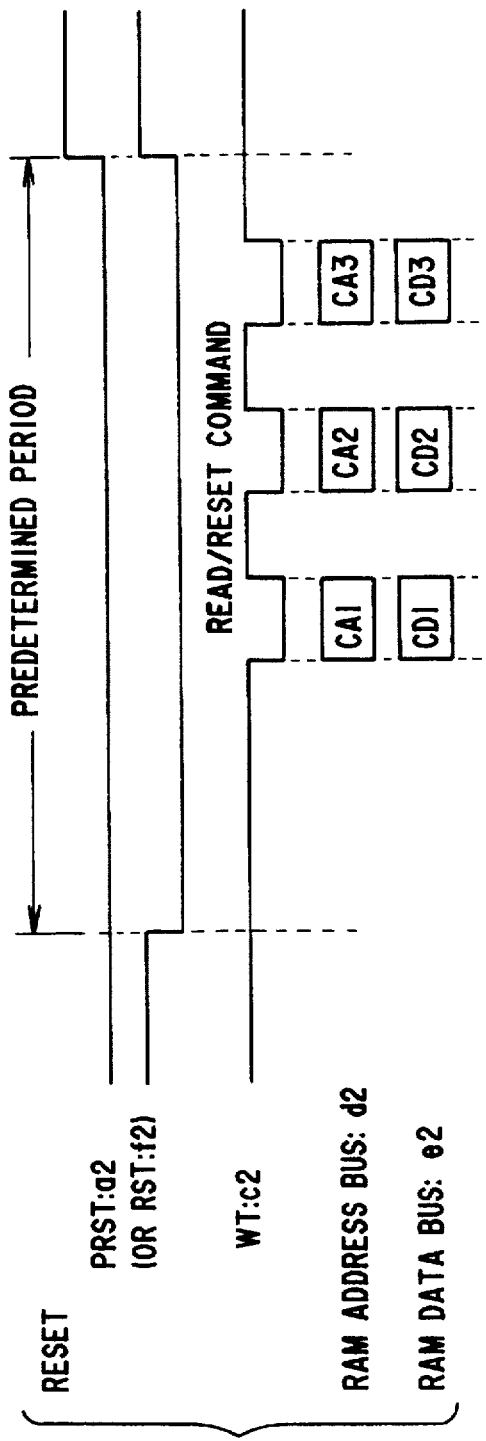
FIG. 20 is a timing chart for a reset cycle to be performed when power supply is turned on or when a reset request occurs.

FIG. 20 is a timing chart for a reset cycle to be performed when power is turned on or when a reset request occurs.

A PRST signal a2 is output from the power-on reset circuit 33 to the reset control circuit 34 for a predetermined period immediately after the power is turned on, and then an RST signal f2 is output from the reset control circuit 34 to the CPU 35 and the like for a predetermined period, whereby hardware components to be initialized immediately after the power on and hardware components to be initialized by an ordinary reset operation are all initialized. More specifically, the CPU 35 and DMAC 36 shown in FIG. 18 are initialized by this operation.

When the RST signal f2 or PRST signal a2 is input to the command identifying circuit 40 in the flash memory control circuit 32, a command sequence is implemented on the flash memory 31. That is, three write operations are carried out on the flash memory 31, as shown in FIG. 18. At this time, the WT signal c2 is activated and, simultaneously therewith, command addresses CA1, CA2 and CA3 and command data CD1, CD2 and CD3 are output to the flash memory 31 via the RAM address bus d2 and the RAM data bus e2.

The command timing circuit 41 adjusts the timing of the three writing operations by the command timing circuit 41, and the command addresses and command data are output via the address bus driver 45 and data bus driver 46 in accordance with the timing. Thus, the flash memory 31 enters the readout mode, and the initialization thereof is completed. Thereafter, the CPU 35 reads out the initial program from the flash memory 31 to execute the program.

Thus, the flash memory control circuit 32 performs the initialization operation on the flash memory 31, i.e., implements the command sequence on the flash memory 31, when the power-on reset is carried out immediately after the power on. Therefore, the flash memory certainly enters the read-out mode independently of the CPU.

That is, the CPU never performs on the flash memory an erroneous operation which may occur due to a command sequence disordered by the power-on reset. Therefore, even when an instantaneous power failure occurs during the implementation of a command sequence on the flash memory, a read-out failure of data or program stored in the flash memory can be prevented. This is particularly useful for systems in which an initial program to be executed by a CPU at the time of power on is stored in a flash memory thereof.

Where a reset request signal n2 is input from an external circuit to the reset control circuit 34 as required or when an abnormal condition occurs, the rest operation is carried out in substantially the same manner as described above.

As shown in FIG. 20, the RST signal f2 is output from the reset control circuit 34 for a predetermined period, and the WT signal c2, command addresses CA1, CA2 and CA3, and command data CD1, CD2 and CD3 are output from the flash memory control circuit 32 to the flash memory 31, similarly to the power-on reset operation. That is, the flash memory 31 enters the readout mode, and the CPU 35 executes a program read out of the flash memory 31.

Therefore, when the system is reset from the external as required or when an abnormal condition of the CPU 35 or DMAC 36 occurs, a read-out failure of data or program stored in the flash memory 31 can be prevented.

Next, there will be described a method of controlling the flash memory when the CPU 35 writes data into the flash memory 31.

Figure 21:
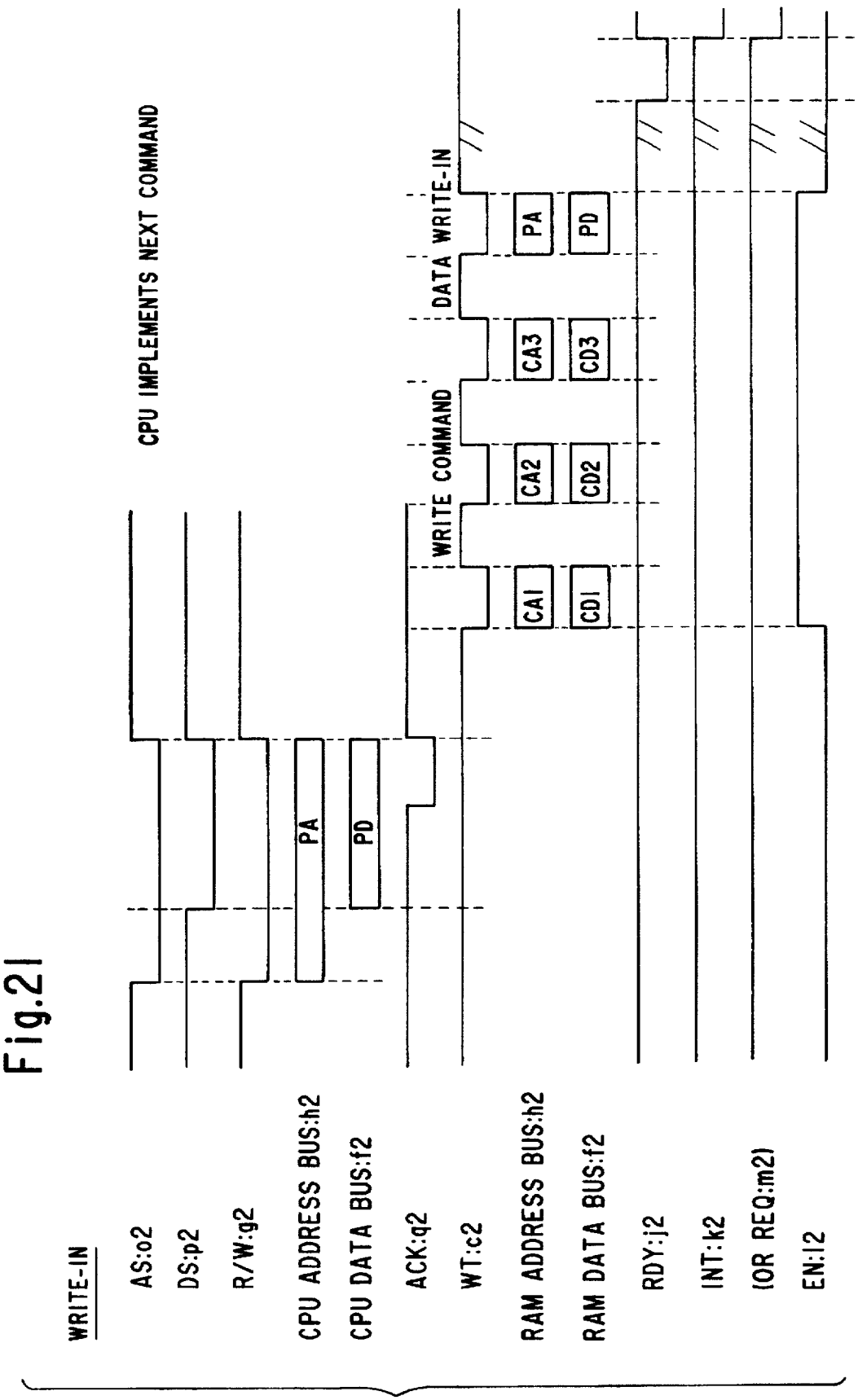
FIG. 21 is a timing chart for a data write-in cycle in which data is written in a flash memory.

FIG. 21 is a timing chart for a data write-in cycle in which data is written into the flash memory 31. To write data into the flash memory 31, a process for erasing data previously written into the flash memory 31 is performed. (This process is not shown in FIG. 21.) After this process, the data write-in cycle is performed in accordance with the timing chart shown in FIG. 21.

In order to write data into the flash memory 31, the CPU 35 activates an address strobe (AS) signal o2, a data strobe (DS) signal p2 and a read/write (R/W) signal g2, and outputs an address PA of the flash memory 31 to be written onto the CPU address bus h2 and data PD to be written onto the CPU data bus i2, as shown in FIG. 21.

The flash memory control circuit 32 detects these signals by means of the command identifying circuit 40 and the latch control circuit 43, then latches the address PA and data PD shown in FIG. 21 by means of the address latch circuit 47 and data latch circuit 48, and outputs an acknowledge (ACK) signal q2 indicative of the completion of the data write-in cycle to the CPU 35 via the acknowledge timing circuit 49.

Thereafter, the CPU 35 can start implementing the next command. That is, the CPU 35 does not directly implement the command sequence to control the flash memory 31. Thus, the burden to the CPU 35 can be alleviated.

On the other hand, the flash memory control circuit 32 separates the RAM address bus d2 from the CPU address bus h2 and the RAM data bus e2 from the CPU data bus i2 by way of a bus enable (EN) signal 12. In this sate, the flash memory control circuit 32 executes three write commands on the flash memory 31. As shown in FIG. 21, the implementation of these three write commands are achieved by outputting a flash memory write (WT) signal c2, command addresses CA1, CA2 and CA3, and command data CD1, CD2 and CD3. This allows the flash memory 31 to enter the write-in mode.

Thereafter, the flash memory control circuit 32 outputs the address PA and data PD respectively latched in the latch circuits 47 and 48 along with the WT signal c2 to write the data PD into the address PA of the flash memory 31. Thus, the data write-in is completed by implementing a four-writecommand sequence on the flash memory.

After the completion of the data write-in, the flash memory control circuit 32 deactivates the EN signal 12 to connect the RAM address bus d2 to the CPU address bus h2, and the RAM data bus e2 to the CPU data bus i2.

The flash memory control circuit 32 receives from the flash memory a ready (RDY) signal j2 indicative of the completion of the data write-in for the flash memory 31, and provides the CPU 35 with information indicative of the completion of the data write-in by way of an interrupt (INT) signal k2. Generally, the INT signal k2 is input to the CPU 38 for interruption. The flash memory 31 returns into the read-out mode after the completion of the write command sequence.

As described above, the flash memory control circuit 32 detects the data write-in signal output from the CPU 35 to the flash memory 31, then implements the write command sequence to write the data into the flash memory in place of the CPU 35, and thereafter provides the CPU 35 with information indicative of the completion of the data write-in for the flash memory 31. Therefore, the burden to the CPU 35 is significantly alleviated in comparison with the case where the CPU 35 directly implements a write command sequence to write data into the flash memory 31.

Next, a data read-out process in which the CPU 35 reads out data from the flash memory 31 will be described with reference to a flow chart shown in FIG. 22.

Since the flash memory 31 is generally in the read-out mode and is ready for data read-out, there is no need to write a read command.

Figure 22:
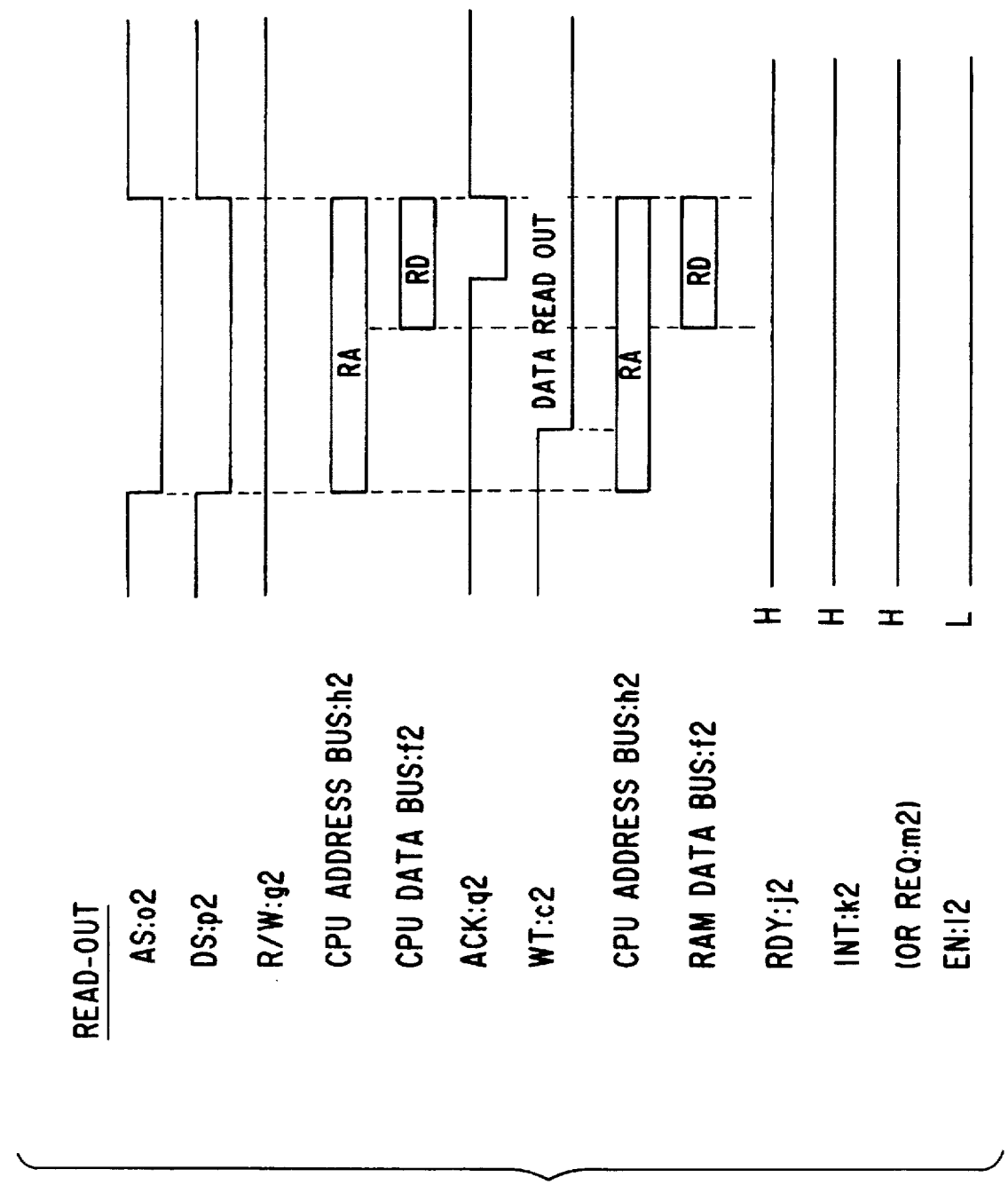
FIG. 22 is a timing chart for a data read-out cycle in which data is read out of the flash memory.

As shown in FIG. 22, the CPU 35 outputs an address strobe (AS) signal o2, data strobe (DS) signal p2, read/write (R/W) signal g2, and an address (RA) of the flash memory 31 desired to be read out onto the CPU address bus h2.

When detecting the AS signal o2, DS signal p2 and R/W signal g2, and recognizing that there exists a data read-out request, the flash memory control circuit 32 activates a flash memory read (RD) signal b2 to read out data from the flash memory 31 without switching the address bus d2 and the data bus e2 by way of a bus enable (EN) signal 12.

At this time, the flash memory control circuit 32 keeps connecting the RAM address bus d2 to the CPU address bus h2 and the RAM data bus e2 to the CPU data bus i2. Therefore, the data read out of the flash memory 31 is output to the CPU address bus h2 and transmitted to the CPU 35.

When the data read-out is carried out, the flash memory control circuit 32 responds to the CPU 35 with an acknowledge (ACK) signal q2 indicative of the completion of the data read-out cycle at a predetermined time.

As described above, the flash memory 31 is generally in the read-out mode and, therefore, the data read-out from the flash memory 31 can be carried out in substantially the same manner as the data read-out from an ordinary RAM or the like memory, without burdening the CPU 35.

Further, the DMAC 36 shown in FIG. 18 implements data write-in and data read-out operations on the flash memory 31 in substantially the same manner as those implemented by the CPU 35 shown in FIGS. 21 and 22, except the following points.

To implement the data write-in or read-out operation on the flash memory 31, the DMAC 36 requests the CPU 35 to open buses by outputting a bus request (BR) signal r2 to the CPU 35. If it is possible to open the buses, the CPU 35 outputs a bus grant (BG) signal s2 to the DMAC 36 in response to the BR signal to notify the DMAC 36 that the buses can be opened, and opens the CPU address bus h2 and the CPU data bus i2 for the DMAC 36. Upon the detection of the BG signal s2, the DMAC 36 performs the data read-out or write-in operation on the flash memory 31. The timing of the signals in the data read-out and write-in command sequence is the same as shown in FIGS. 21 and 22.

On the other hand, the flash memory control circuit 32 determines which bus master of the CPU 35 and DMAC 36 exclusively utilizes the buses at present by detecting the BG signal s2 output from the CPU 35. When the flash memory control circuit 32 recognizes that the current bus master is the DMAC 36, the flash memory control circuit 32 detects a ready (RDY) signal j2 output from the flash memory 31 after the completion of the data write-in command sequence. Thereafter, the flash memory control circuit 32 provides the DMAC 36 with information indicating that the next data writein has become possible by outputting a request (REQ) signal m2.

Thus, the flash memory control circuit 32 implements the write-in sequence on the flash memory 31 in the place of the DMAC 36, and informs the DMAC 36 that the data write-in is completed upon the completion of the data write-in for the flash memory 31. Therefore, a DMA transfer from the DMAC 36 to the flash memory 31 is realized, similarly to an ordinary DMA transfer to the RAM.

The flash memory controlling systems of the present invention have advantages as previously described in the embodiments. Therefore, the reliability and performance of computers and the like systems can be significantly improved which utilize the flash memory controlling systems having the structures and functions described in the foregoing embodiments.

As can be understood from the foregoing, since error check codes corresponding to data stored in a flash memory are stored in separate storage means in accordance with the present invention, the reliability of the data stored in the flash memory and hence the reliability of a system employing the flash memory can be significantly improved. The use of a volatile memory as the storage means for storing error check codes realizes a less expensive system construction and yet improves the reliability of a system utilizing the flash memory. Since the flash memory controlling system has command sequence detecting means which serves to inhibit the read-out and write-in operations for the storage means, an unnecessary error check code can be prevented from being stored in the storage means.

In accordance with the present invention, the flash memory controlling system employing a flash memory as storage means for storing error check codes is adapted to perform an error check code read-out or write-in operation simultaneously with a data read-out or write-in operation after the completion of a command sequence. Therefore, the reliability of data can be ensured even if power supply to the system is shut off for a long time.

Further, an error check code can be read out of or write into the flash memory under the control of firmware which is employed as control means. Alternatively, this operation can be achieved by detecting the completion of the command sequence by way of hardware, or by automatic process by way of hardware independently of the control means. This allows for a flexible structural design of a system utilizing a flash memory.

In the flash memory controlling system, comparator means compares an error check code generated by check code generating means with an error check code stored in the storage means. Therefore, the reliability of data stored in the flash memory and hence the reliability of a system utilizing the flash memory can be improved.

In the flash memory controlling system of the present invention, signal detection controlling means detects predetermined initialization information to initialize the flash memory. Therefore, a reset request occurring due to an instantaneous power failure, abnormal system condition or other requirements does not prevent the read-out and write-in operations for the flash memory.

Further, when detecting data write-in information or data read-out information output from data write-in means or data read-out means, the signal detection controlling means performs the data write-in operation or the data read-out operation on the flash memory in the place of the data-writein means or the data read-out means. Therefore, the burden to a microprocessor serving as the data wire-in means or data read-out means can be alliviated. Still further, a dynamic memory access controller employed as the data write-in means or the data read-out means provides for the DMA transfer to the flash memory.

What is claimed is:

1. A flash memory controlling system, comprising:
   a first flash memory capable of data read-out and data write-in;
   check code generating means for generating a data error check code;
   storage means for storing therein the error check code generated by the check code generating means; and
   control means for implementing a process sequence for data read-out or data write-in on the first flash memory while allowing the check code generating means to generate an error check code for data read out of or written into the first flash memory, and storing the generated error check code in the storage means; and first command sequence detecting means for detecting start and end of a command sequence for data read-out or data write-in during the process sequence implemented by the control means; and first memory control means for controlling operations of the first flash memory and the storage means, wherein, when the first command sequence detecting means detects the start of the command sequence, the first memory control means controls the storage means so as to prevent the control means from performing read-out and write-in operations on the storage means during implementation of the command sequence.

2. A flash memory controlling system as set forth in claim 1, wherein the storage means is a volatile memory, said flash memory controlling system further comprising power supply means for backing up the volatile memory for retention of the error check code stored therein.

3. A flash memory controlling system as set forth in claim 1, wherein, when the first command sequence detecting means detects the end of the command sequence, the first memory control means controls the first flash memory to permit the control means to perform an actual data read-out or write-in operation immediately after the completion of the command sequence, and controls the storage means so as to permit the storage means to implement the read-out or write-in of an error check code.

4. A flash memory controlling system, comprising:

a first flash memory capable of data read-out and data write-in; check code generating means for generating a data error check code;

storage means for storing therein the error check code generated by the check code generating means; and control means for implementing a process sequence for data read-out or data write-in on the first flash memory while allowing the check code generating means to generate an error check code for data read out of or written into the first flash memory, and storing the generated error check code in the storage means; wherein the storage means is a second flash memory, said flash memory controlling system further comprising second memory control means for controlling read-out and write-in operations for the second flash memory; and selecting means for selecting either one of a first path connecting the control means to the second flash memory and a second path connecting the check code generating means to the second flash memory in accordance with selection information which is written by the control means, wherein, when the control means implements a command sequence for data read-out or data write-in on the first flash memory during the process sequence, the selecting means selects the first path so as to permit the control means to implement the command sequence on the second flash memory, and when the control means implements actual data read-out or data write-in on the first flash memory during the process sequence, the selecting means selects the second path so as to permit the control means to implement read-out or write-in of the error check code on the second flash memory, and the second memory control means permits the control means to read out of or write into the second flash memory only an error check code corresponding to data to be actually stored in the first flash memory.

5. A flash memory controlling system as set forth in claim 4, wherein the selecting means includes retention means for retaining the selection information written therein by the control means, and first connection switching means for selectively connecting either one of the first and second paths to the second flash memory in accordance with the selection information written therein, and when the control means writes ON information indicative of start of the command sequence into the retention means, the first connection switching means connects the first path to the second flash memory, and then the control means implements the command sequence, and when the control means writes OFF information indicative of end of the command sequence into the retention means, the first connection switching means connects the second path to the second flash memory, and then the control means implements the read-out or write-in of the error check code on the second flash memory.

6. A flash memory controlling system as set forth in claim 5, wherein the selecting means further includes second command sequence detecting means for detecting the command sequence and providing detection information to the retention means, and when the second command sequence detecting means detects the end of the command sequence and notifies the retention means of the completion of the command sequence, the selection information retained in the retention means is automatically rewritten into OFF information.

7. A flash memory controlling system as set forth in claim 4, wherein the selecting means includes third command sequence detecting means for detecting the command sequence and outputting detection information, and second connection switching means for selectively connecting either one of the first and second paths to the second flash memory in accordance with the detection information sent from the third command sequence detecting means, and when detecting the start of the command sequence, the third command sequence detecting means sends the detection information to the second connection switching means to allow the second connection switching means to connect the first path to the second flash memory, and when detecting the end of the command sequence, the third command sequence detecting means sends the detection information to the second connection switching means to allow the second connection switching means to connect the second path to the second flash memory.

8. A flash memory controlling system as set forth in claim 4, further comprising comparator means for comparing a first error check code stored in the storage means with a second error check code generated by the check code generating means.

9. A flash memory controlling system as set forth in claim 8, wherein the second error check code generated by the check code generating means is a parity bit, and the comparator means detects an error by way of the parity bit.

10. A flash memory controlling system as set forth in claim 8,
- wherein the second error check code generated by the check code generating means is an ECC bit, and
- the comparator means detects an error and corrects the error by way of the ECC bit.

11. A flash memory controlling system comprising:
- a flash memory; initialization means for generating initialization information; and signal detection controlling means for controlling data read-out and data write-in for the flash memory,
- wherein, when detecting predetermined initialization information output form the initialization means, the signal detection controlling means initializes the flash memory,
- wherein the initialization means is a power-on reset control circuit, and the signal detection controlling means implements a predetermined initialization sequence on the flash memory in response to the initialization information output from the power-on reset control circuit to allow the flash memory to enter a read-out mode.

12. A flash memory controlling system comprising:
- a flash memory;
- initialization means for generating initialization information; and
- signal detection controlling means for controlling data read-out and data-write-in for the flash memory,
- wherein, when detecting predetermined initialization information output from the initialization means, the signal detection controlling means initializes the flash memory,
- Wherein the initialization means is a reset control circuit, and the signal detection controlling means implements a predetermined initialization sequence on the flash memory in response to the initialization information output from the reset control circuit to allow the flash memory to enter a read-out mode.

13. A flash memory controlling system comprising:
- a flash memory signal detection controlling means for controlling data read-out and data-write-in for the flash memory; and
- data write-in means,
- wherein, when detecting data write-in information output from the data write-in means, the signal detection controlling means performs a data write-in operation on the flash memory, said system further comprising data readout means,
- wherein, when detecting data write-in information or data read-out information output from the data write-in means or the data read-out means, the signal detection controlling means perform a data write-in operation or a data read-out operation on the flash memory.

14. A flash memory controlling system as set forth in claim 13, wherein the data write-in means and the data read-out means are a microprocessor.

15. A flash memory controlling system as set forth in claim 13,
- wherein the data write-in means and the data read-out means are a dynamic memory access controller, and
- after implementing the data write-in operation or the data write-in operation on the flash memory, the signal detection controlling means permits the dynamic memory access controller to write into or read out of the flash memory the next data.

16. A flash memory controlling system comprising:
- a flash memory;
- initialization means for generating initialization information; and
- signal detection controlling means for controlling data read-out and data-write-in for the flash memory,
- wherein, when detecting predetermined initialization information output from the initialization means, the signal detection controlling means initializes the flash memory, said system further comprising:
  - check code generating means for generating a data error check code;
  - storage means for storing therein the error check code generated by the check code generating means; and
  - control means for implementing a process sequence for the data read-out or data write-in on the first flash memory while allowing the check code generating means to generate an error check code for data read out of or written into the first flash memory, and storing the generated error check code in the storage means.

17. A flash memory controlling system as recited in claim 4, wherein said selecting means comprises a multiplexer for multiplexing the first path and the second path to the second flash memory.

18. A flash memory controlling system as recited in claim 17, wherein said first path and said second path comprise data buses, and wherein said multiplexer is connected to said second flash memory by a third path which also comprises a data bus.

* * * * *